(12) United States Patent
Tackett et al.

(10) Patent No.: US 6,604,090 B1
(45) Date of Patent: *Aug. 5, 2003

(54) SYSTEM AND METHOD FOR SELECTING RESPONSES TO USER INPUT IN AN AUTOMATED INTERFACE PROGRAM

(75) Inventors: Walter A. Tackett, San Francisco, CA (US); Scott S. Benson, Burlingame, CA (US)

(73) Assignee: Nativeminds, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,213

(22) Filed: Feb. 3, 1998

Related U.S. Application Data

(63) Continuation-in-part of application No. 08/868,713, filed on Jun. 4, 1997, now Pat. No. 6,363,301.

(51) Int. Cl.[7] .......................... G06F 17/00; G06F 13/00; G06F 17/30
(52) U.S. Cl. ..................... 706/11; 345/352; 345/353; 345/354; 345/146; 345/348; 345/349; 345/350; 345/351; 345/978; 707/5
(58) Field of Search ..................... 706/11; 395/613; 345/352–354, 146, 348–351, 978; 707/5

(56) References Cited

U.S. PATENT DOCUMENTS

| | | | |
|---|---|---|---|
| 5,161,110 A | | 11/1992 | Dorchak ................ 700/108 |
| 5,371,807 A | | 12/1994 | Register et al. ........... 382/159 |
| 5,384,893 A | | 1/1995 | Hutchins ................. 704/267 |
| 5,442,786 A | * | 8/1995 | Bowen et al. ............ 395/600 |
| 5,526,407 A | | 6/1996 | Russell et al. ........... 379/88.01 |
| 5,535,323 A | | 7/1996 | Miller et al. ............. 345/338 |
| 5,553,218 A | * | 9/1996 | Li et al. ................. 395/148 |
| 5,568,639 A | * | 10/1996 | Wilcox et al. ............ 395/600 |
| 5,587,903 A | * | 12/1996 | Yale et al. ............... 395/759 |
| 5,600,765 A | * | 2/1997 | Ando et al. .............. 395/133 |
| 5,606,712 A | * | 2/1997 | Hidaka ................... 395/800 |
| 5,682,539 A | | 10/1997 | Conrad et al. ............. 704/9 |
| 5,712,987 A | * | 1/1998 | Waits et al. .............. 395/210 |

(List continued on next page.)

OTHER PUBLICATIONS

Stephen W. L., "Graphical User Interface Validation: A problem Analysis and a Strategy to Solution", IEEE proceedings of the 24th Annual Hawaii International Conference on System Sciences, Jan. 1991.*

Kaplan, R.. (1975). "A General Syntactic Processor" *In Natural Language Processing.* R. Rustin ed., Algorithmics Press, Inc., pp. 193–241.

Reichman, R.. (1978). "Conversational Coherency," *Cognitive Science* 2:283–327.

(List continued on next page.)

*Primary Examiner*—George B. Davis
(74) *Attorney, Agent, or Firm*—Morrison & Foerster LLP

(57) ABSTRACT

An automated interface program designed to interact and communicate with users, is disclosed that defines a list of categories activatable by the program; identifies a set of categories activated by user input; selects another set of categories from the activated categories based upon a metric and thereafter executes actions associated with the selected categories. The metric is a computed value based on conditions located within each category. The metric gives an estimate of the appropriateness of the particular response included in an activated category. This estimate is currently based on the current input and the current state of the automated interface program at the time user input is entered.

28 Claims, 17 Drawing Sheets

U.S. PATENT DOCUMENTS

| | | | | |
|---|---|---|---|---|
| 5,758,323 | A | | 5/1998 | Case .......................... 704/278 |
| 5,760,768 | A | * | 6/1998 | Gram .......................... 345/333 |
| 5,801,710 | A | * | 9/1998 | Cok et al. .................... 345/440 |
| 5,835,087 | A | * | 11/1998 | Herz et al. ................... 345/327 |
| 5,864,844 | A | * | 1/1999 | James et al. ................... 707/4 |
| 5,877,759 | A | | 3/1999 | Bauer .......................... 709/317 |
| 5,894,311 | A | * | 4/1999 | Jackson ........................ 345/440 |
| 5,924,089 | A | | 7/1999 | Mocek et al. ................... 707/4 |
| 5,933,827 | A | * | 8/1999 | Cole et al. .................... 707/10 |
| 5,974,405 | A | | 10/1999 | McGuinness et al. ......... 706/45 |
| 5,995,921 | A | * | 11/1999 | Richards et al. ............... 704/9 |
| 6,012,055 | A | | 1/2000 | Campbell et al. .............. 707/5 |
| 6,195,657 | B1 | * | 2/2001 | Rucker et al. .................. 707/5 |
| 6,275,813 | B1 | * | 8/2001 | Berka .......................... 705/30 |

OTHER PUBLICATIONS

Reichman, R.. (1985). *Getting Computers to Talk Like You and Me*. A Bradford Book. The MIT Press, Chapter 2, pp. 21–33, Chapter 5, pp. 67–90 and Chapter 6, pp. 155–166.

Sidner, C. L.. (1985). "Plan Parsing For Intended Response Recognition in Discourse," *Comput Intell* 1:1–10.

Grosz, B.J. and C. Sidner (1986). "Attention, Intentions, and the Structure of Discourse," *Computational Linguistics* 12(3):175–204.

Grosz, B. J. (1986). "The Representation and Use of Focus in a System for Understanding Dialogs" *In Readings in Natural Language Processing*. B.J. Grosz et al. eds., Morgan Kaufmann Publishers, Inc., pp. 353–362.

Sidner, C. L. (1986). "Focusing in the Comprehension of Definite Anaphora" *In Readings in Natural Language Processing*. B.J. Grosz et al. eds., Morgan Kaufmann Publishers, Inc., pp. 363–394.

Cohen, R..(1987). "Analyzing the Structure of Argumentative Discourse," *Computational Linguistics* 13(1–2):11–24.

Grosz, B. et al.. (1987). "TEAM: An Experiment in the Design of Transportable Natural–Language Interfaces," *Artificial Intelligence* 32:173–243.

Litman, D. et al.. (1987). "A Plan Recognition Model for Subdialogues In Conversations," *Cognitive Science*11:163–200.

Hirschberg, J. et al.. (1993). "Empirical Studies on the Disambiguation of Cue Phrases," *Computational Linguistics* 19(3):501–530.

Allen, J.. (1995). *Natural Language Understanding*. The Benjamin/Cummings Publishing Company, Inc., Chapter 14, pp. 429–461 and Chapters 16 and 17 pp. 503–576.

* cited by examiner

Web Interface Case (Chat Site/Virtual World Interface Case)

SYSTEM AND METHOD FOR SELECTING RESPONSES TO USER INPUT IN AN AUTOMATED INTERFACE PROGRAM

STATEMENT OF RELATED CASES

This current application is a continuation-in-part of Ser. No. 08/868,713, entitled "Methods for Automatically Focusing the Attention of a Virtual Robot Interacting with Users", filed Jun. 4, 1997, by Tackett et al now U.S. Pat. No. 6,363,301.

REFERENCE TO A "MICROFICHE APPENDIX"

Submitted herewith this present application (and on deposit in the United States Patent and Trademark Office) is a microfiche appendix comprising source code of a present embodiment of the present invention. There are 178 frames contained in 2 pages of microfiche.

BACKGROUND OF THE ART

For the purposes of the present invention, "virtual robots" (or "BOTs") are software programs that interact and/or communicate with users (human, machine or otherwise) that take actions or make responses according to input from these users. BOTs are the subject of the co-pending and co-assigned parent application entitled "Methods for Automatically Focusing the Attention of a Virtual Robot Interacting with Users", filed Jun. 4, 1997, Ser. No. 08/868,713, and incorporated by reference in its entirety herein. A common use of such a BOT is as an interface to a web site wherein the administrator of that site has programmed the BOT to answer simple inquiries that are typically asked by visitors to the site. The above identified application discloses a method of creating BOTs according to "scripts"—i.e. programs that are written in a very high level language that closely resembles a human natural language. These scripts embody a certain amount of information concerning the site that the administrator desires the BOT to communicate to a user during a connection session.

In such a BOT controlled by a script, it is the function of the BOT script to determine the response to any given user input. Ordinarily, a BOT script is written in such a way that, for each response it might make, it explicitly states a set of conditions (which may relate to both the input and the internal state of the BOT) that must be true in order for that response to be appropriate. Thus, for any particular input and internal BOT state, zero or more responses will be appropriate. These responses are said to "match" the input, although there is no requirement that the selection of responses is based on pattern-matching.

A BOT script can be written in such a way that at most one response will match any input. One way to achieve this is by requiring the conditions associated with the responses to be mutually exclusive, so that at most one response has a true condition for any input. Another way is to impose a fixed total ordering on any set of responses in the script that might conflict—for instance, by assigning a priority according to the order in which the responses appear in the script or by attaching explicit priority numbers to each response.

Such solutions are particularly difficult to implement in natural language systems, in which there are often a large number of rules in the script and an unbounded variety of probable inputs. If the conditions are made mutually exclusive, then the addition of a new rule may require modification of an arbitrary number of other rules. While if the conditions are kept in a fixed order, the addition of a new rule requires a complicated decision about where in the fixed order it belongs. Therefore, in designing a BOT script, it is useful to allow a particular input to be matched by more than one possible response.

If the BOT script allows more than one response to match an input, and does not provide any explicit total ordering on the possible responses, there are several ways in which the set of possible responses could be used. The BOT execution system might present all of the possible responses to the user, either in ordered or unordered form, or it might select one, or several, of the possible responses. In the case where the BOT execution system is either ordering the possible responses or selecting some subset of the responses, the execution system must have an automated way of deciding among the set of possible responses. One such mechanism is to "focus" the attention of the BOT to a particular set of conversational categories, as discussed in the above-incorporated application.

However, there are many instances where a method based purely on the context of the conversation is insufficient. For instance, consider the following two inputs that might be given to a BOT: "What is a bot?", "What is a sales bot?". The first input might be handled in the BOT script by a condition that checks to see whether the input starts with the word "what" and contains the word "bot", while the second input might be handled by a condition that checks to see whether the input starts with the word "what" and contains the words "sales bot". Clearly both conditions are true for the input "What is a sales bot?"; but (presumably) the BOT should give the answer to the second condition regardless of the context of the question. Of course, in this case, the BOT author could resolve the problem by modifying the first condition so that it checks to see whether the starts with the word "what", contains the word "bot", and does not contain the word "sales", but in general it is difficult and time-consuming for the BOT author to anticipate every possible such conflict between answers, and difficult to add to the script once written. Similarly, the BOT author could resolve the problem by insuring that the second condition is always tested before the first condition, but maintaining an ordering on all the possible conditions that might be added makes the BOT authoring task considerably more difficult.

Therefore, in the case where a BOT script provides conditions under which a response is appropriate, there is a need in the art for an automatic method of selecting a response from a number of possible responses such that the BOT author does not need to make the conditions mutually exclusive nor impose a fixed ordering on the conditions.

There is also a need for this mechanism to produce appropriate responses to both context-sensitive and context-independent inputs. For example, on an input such as "Who is he?", the context of such an input is not entirely obvious. But, other inputs such as "Who is the president of Neuromedia?", should elicit a unique response that is less dependent on the context of the statement. Thus, this mechanism should attempt to work equally well on both types of statements. In particular, there is a need to handle the problem of ambiguity that the pronouns inject into a conversation.

In addition, there is a need for this response selection mechanism to be efficient for large BOT scripts. As most BOTs are designed to handle queries from one to many simultaneous users, real-time performance is a practical consideration for such a mechanism.

SUMMARY OF THE INVENTION

The present invention meets these aforementioned needs by providing a variety of mechanisms for automatically and efficiently selecting a response from a number of possibilities. In one aspect of the present invention, in an automated interface program designed to interact and communicate with users, said program executing actions when a category among a set of predefined categories is activated, a method is disclosed for selecting a category given a situation or user input, the steps of said method comprising:

(a) defining a list of categories activatable by said program;
(b) for an input,
(i) identifying a first set of categories activated by said input;
(ii) selecting a second set of categories from said first set of activated categories based upon a metric, said metric computed based on the conditions located within each said activated category;
(iii) executing actions associated with said second set of categories.

In one aspect of the present invention, the metric disclosed in the selecting step above is an estimate of the appropriateness of the particular response included in an activated category. This estimate is currently based on the current input and the current state of the BOT upon said input.

In one aspect, the metric is a numeric value computed for each activated category, the value being based upon the frequency of matched words, partial words, symbols and the like found in the current input with words, partial words, symbols and the like found in the conditional clauses located within the category. Thus, as between two activated categories that could potentially respond to a given input, the metric acts as a filter to select that category that is "more appropriate"—e.g. the category that may have more words matched in its conditional clause than the other category is likely to be "more appropriate".

In another aspect of the present invention, the metric may reflect the testing of a Boolean variable located in the category, the truth or falsity of said Boolean variable aiding in determining whether the category is selected or not. Some Boolean variables might be instantiated as a "memory attribute" that tests certain conditions based upon content-dependent aspects of the input—e.g. a memory attribute might test for whether the input discusses some aspect of the cost of a product (e.g. "what is the price?"; "what does it cost?"; "how much do I need to spend?"). These memory attributes can thus be set; and may be persistent over the course of the conversation with the user. Other types of Boolean variables or conditions can be devised.

In another aspect of the present invention, a user-defined mechanism allows topics of conversation to be associated with a subject. A pronoun replacement mapping is additionally associated with the subject. Whenever a topic becomes active during the course of interaction with a user, the pronoun replacement mapping likewise becomes active. The effect of the mapping is such that whenever a pronoun is used by the user, such pronoun is replaced by a pre-defined object of conversation.

Other aspects of the category selection mechanism are disclosed in the below description when read in conjunction with the accompanying figures.

DETAILED DESCRIPTION OF THE INVENTION

I. Overview and General Architecture

The term "robot" is used interchangeably with "BOT" throughout the remainder of this application. For the purposes of the present invention, both "BOT" and "robot" refer to any program which interacts with a user in some fashion, and should not be assumed to refer only to physically embodied robots.

Figure 1:
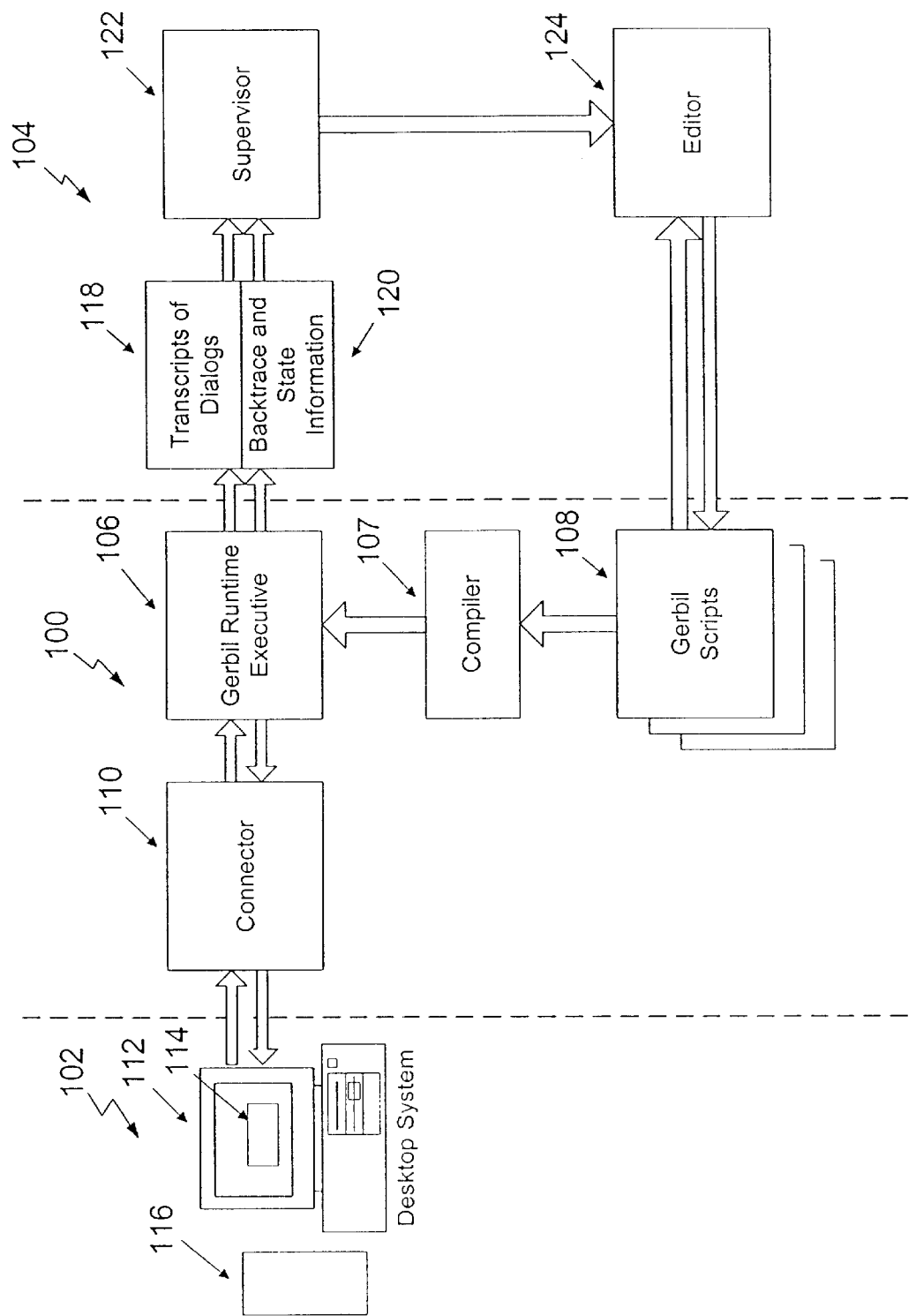
FIG. 1 depicts a suitable operating environment for the purposes of the present invention.

Referring now to FIG. 1, the operating environment of the present invention is depicted. The environment can be characterized generally into three partitions: front end 102; BOT processor 100; and back end 104. Front end 102 is generally the environment in which a human user 116 consults a virtual BOT interface 114 via a computer 112 that may be connected to the BOT processor via a communications link, such as through a server connected to the Internet or alternatively directly connected to BOT processor 100. It will be appreciated that many other means of connection to BOT processor 100 are well known to those skilled in the art and that the present invention should not be limited to the any particular aspects of the general operating environment as disclosed herein.

Typically, human user 116 connects to a site whose interface of first impression is a virtual BOT interface 114. The advantage for the site developer is that human user 116 may have a help or information request that is easily handled via BOT interface 114. Today, it is not uncommon to find sites having a list of FAQs ("Frequently Asked Questions") that serve this purpose of handling very low level user concerns and questions. However, for more advanced questions or interactions with the site, virtual BOTs will become increasing popular.

In the operating environment of this embodiment of the present invention, BOT interface 114 is an instantiation of a process that is spawned by BOT processor 100 via connection 110. BOT processor 100 itself may comprise connection 110; runtime executive process 106, compiler 107, and a set of BOT programs 108. As users 116 log onto a site having BOT processor 100 via connection 110, runtime executive 106 executes an interaction routine that guides the discussion that occurs between user 116 and BOT processor 100. Typically, a two way communications dialogue occurs between user 116 and BOT processor 100 wherein user 116 may ask questions, make declarative statements and other normal communications patterns that humans typify. For the purposes of the present invention, "communications" is to be very broadly interpreted. Indeed, suitable communications could be in the form of written or spoken language, graphics, URL's or the like that may be passed to and from a user to an automatic interface program, such as the present invention.

In turn, runtime executive 106 parses the statements and questions generated by the user and responds according to a set of BOT programs 108. As will be discussed in greater detail, BOT programs 108 are typically created at the back end 104 as a set of "scripts" that the BOT processor will tend to engage in with user 116. For example, if the site using BOT processor 100 is a site for a reseller of personal computers, then BOT processor 100 should be designed to handle questions and discussions concerning personal computers and their peripherals in general. Thus, the back end 104 will generate scripts that will guide the discussion concerning many computer-related topics. These script programs 108 are then compiled by compiler 107 and the compiled code is incorporated into runtime executive 106. As will be discussed below, these scripts are written in an English-like language called "Gerbil™"—the name derived from "General Robot Builder Language", as developed by the present assignee, Neuromedia, Inc.

As the two-way discussions between user 116 and runtime executive 106 continue, it is generally desirable to engage in quality control of BOT processor 100. This quality control is provided at back end 104 via feedback loop comprising a transcript of dialogues 118 and backtrace and state information 120 of the BOT processor 100; a supervisor 122 and editor 124. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 122 analyzes the information at 118 and 120 with an eye towards optimizing the performance of the runtime executive. Typically, supervisor 122 could be another human, deciding if the semantics captured by the system needs to be upgraded in response to a dialog transcript that has occurred. If so, supervisor 122 could optionally invoke an editor 124 to edit the Gerbil programs that represent the semantic framework of the runtime executive. These programs would then be re-complied and incorporated into the runtime executive. Supervisor 122 could be a software program (as opposed to another human) that would automatically seek to analyze the performance of the runtime executive and make corrections to the runtime executive through the editing process.

Figure 2:
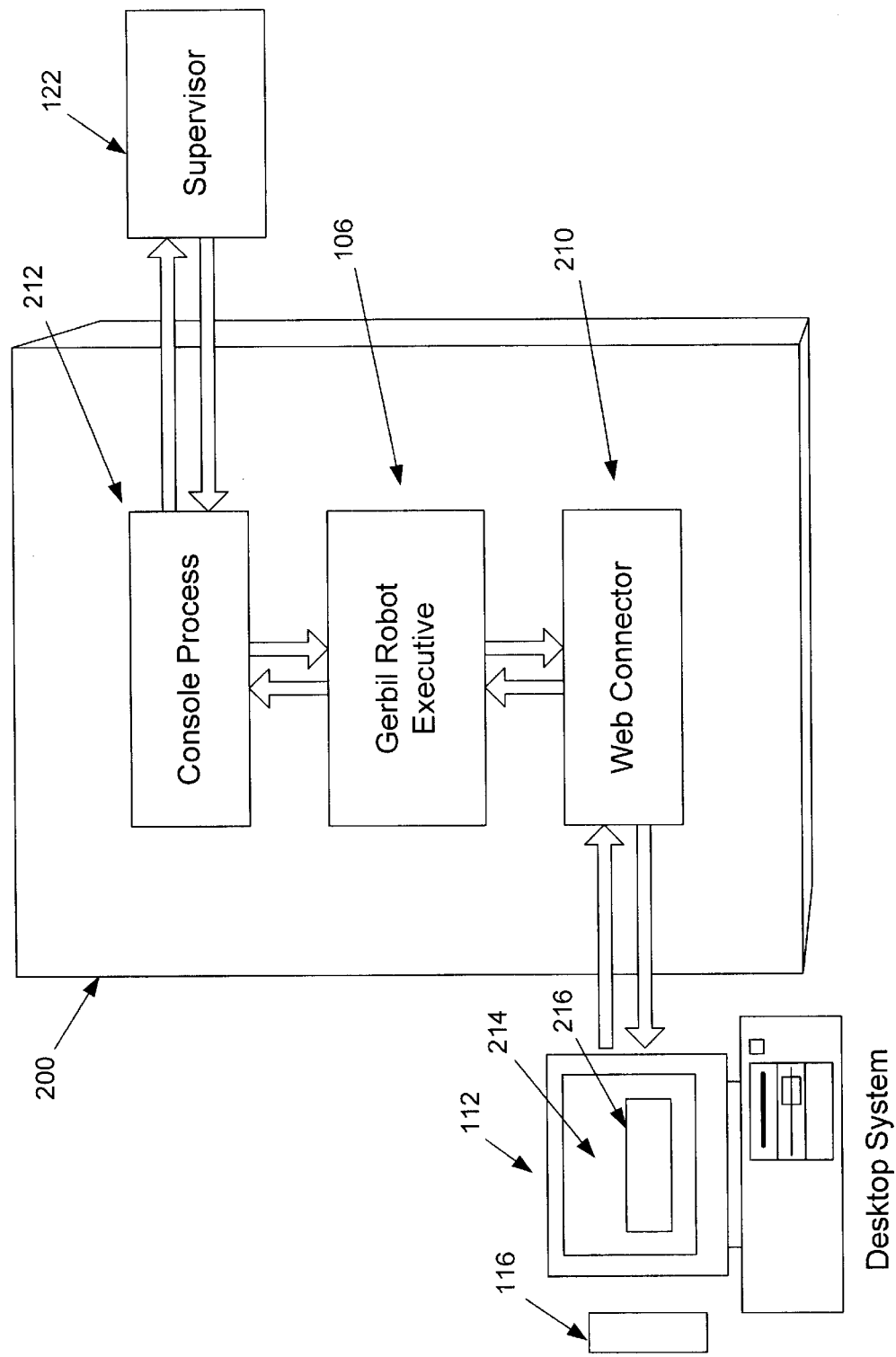
FIG. 2 depicts different operating environments for the purposes of the present invention wherein the connection to user 116 is via an intranet or internet connection.
Figure 3:
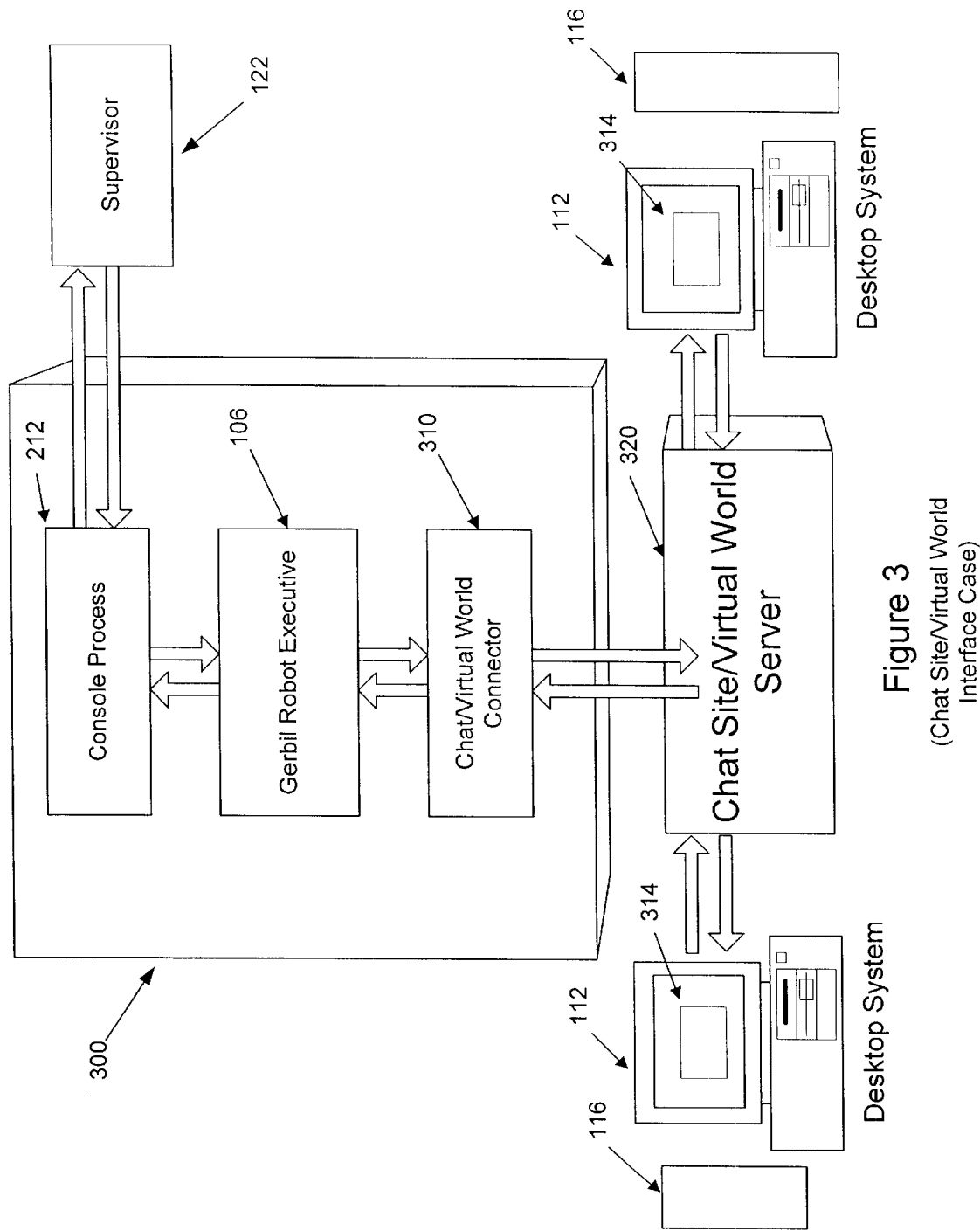
FIG. 3 depicts yet another operating environment wherein the BOT processor is merely a client of another server, such as a chat room or virtual world server.

FIGS. 2 and 3 depict slightly different operating environments for the purposes of the present invention. FIG. 2 depicts a situation wherein the BOT processor 200 connects to user 116 is via an intranet or internet connection e.g. web connector 210. For example, web connector 210 may thus spawn a Java applet 216 inside of an HTML page 214 to provide the two-way communications as discussed above. It will be appreciated that such use of Java applets embedded in HTML pages is well known to those skilled in the art. Alternatively, HTML page 214 might communicate directly with web connector 210 via a CGI connection or some other well-known connection protocol. Likewise, the BOT server can accept HTML requests directly. In such cases, persistent state information can be tracked by a "cookie" set in the web browser or similar means.

As is shown, supervisor 122 interfaces with robot executive 106 via console process 212. Console process 212 monitors the execution of robot executive 106 and may do so with a reduced set of monitoring tasks, such as merely checking to see if robot executive 106 is actively running. FIG. 3 depicts a situation wherein the BOT processor 300 is merely a client of another server, such as a chat room or virtual world server, as depicted by server 320. BOT processor 300 is connected to server 320 via a chat/virtual world connector 310 in much the same fashion as any client would connect to a server site. Users 116 that desire to talk or converse with the BOT processor 300 interact through their client connections 314 in much the same fashion as any client-to-client communications that would be effected on server 320.

Although FIGS. 1, 2 and 3 give a general description of various operating environments in which virtual BOTs may exist, it will be appreciated that many other operating environments are obvious to those skilled in the art and that the scope of the present invention should not be so limited to the exemplary descriptions as given above.

II. BOT Processor Description

A. Script Programs and Language

As mentioned above, runtime executive 106 embodies the necessary information to maintain a reasonable conversation with human users to answer their inquiries and to carry on a general discourse with them on a set of topics. These topics are created by the back end in the form of script programs 108 that are compiled (or interpreted) and incorporated into runtime executive 106. In the preferred embodiment of the present invention, script programs may be written by human designers having little or no formal programming experience. It will be appreciated that script programs can also be written by automated learning programs or through partially automated script creation tools, and that the present invention should not be limited to human-written script programs.

Two exemplars of such script programs are given below in Table 1.

TABLE 1

TWO EXAMPLE SCRIPT PROGRAMS

```
EXAMPLE 1 --
Topic "CatsOrComputers" is
    IfHeard "cat", "computer" then
        IfHeard "cat" then
            Say "What would you like to know about my cat?";
            Focus "Cats";
        Done
        IfHeard "computer" then
            Say "What would you like to know about my computer?";
            Focus "Computers";
        Done
    Done
EndTopic
Topic "Cats" is
    IfHeard "cat", "it" then
        IfHeard "mouse" then
            Say "It caught a mouse once and brought it",
                "to me as a present";
        Done
    Done
EndTopic
Topic "Computers" is
    IfHeard "computer", "it" then
        IfHeard "mouse" then
            Say "The mouse is a PS/2 type mouse with three buttons";
            SwitchTo "Mouse Sales";
        Done
    Continue
EndTopic
Topic "Unknown Input" is
    If ?WhatUserSaid DoesNotContain "cat", "computer", "mouse", "it" then
        Say "Would you like to know about Cats or Computers?";
    Done
EndTopic
Sequence Topic "Mouse Sales" is
    Always
        Say "Would you like to buy one?";
        WaitForResponse;
        IfHeard "no" Then
        Done
        Say "OK, what is your name?";
        WaitForResponse;
        Remember ?UserName is ?WhatUserSaid;
        Say "That will be $199.95",
            "Please enter your credit card number now";
        WaitForResponse;
        Remember ?CardNum is ?WhatUserSaid;
        Say "OK, We'll mail one to you within two weeks";
            "Please give me your mailing address now.";
        WaitForResponse;
        Remember ?Address is ?WhatUserSaid;
    Done
EndTopic
Priority Topic "Swearing Filter" is
    IfHeard "fudge" Then // a popular swear word...
        Say "I'm sorry, that kind of language is not permitted here";
        Do "kick user off system";
    Done
EndTopic
EXAMPLE 2 --
Topic "Price of XV17" is
    Subjects "XV17", "cost";
    IfHeard "XV17", "it" Then
        IfHeard "cost", "how much", "what about" Then
            Say "The XV17 monitor is now available for $699";
        Done
    Continue
EndTopic
Topic "Size of XV17" is
    Subjects "XV17", "features";
    IfHeard "XV17", "it" Then
        IfHeard "size", "how big", "what about" Then
            Say "The XV17 monitor has a 17 inch full-color screen";
        Done
    Continue
EndTopic
Topic "Maker of XV17" is
```

TABLE 1-continued

TWO EXAMPLE SCRIPT PROGRAMS

```
    Subjects "XV17", "maker";
    IfHeard "XV17", "it" Then
        IfHeard "who makes", "what about" Then
            Say "The XV17 monitor is made by NEC";
        Done
    Continue
EndTopic
Topic "Price of 5SG" is
    Subjects "5SG", "cost";
    IfHeard "5SG", "it" Then
        IfHeard "cost", "how much", "what about" Then
            Say "The 5SG monitor is now available for $499";
        Done
    Continue
EndTopic
Topic "Size of 5SG" is
    Subjects "5SG", "features";
    IfHeard "5SG", "it" Then
        IfHeard "size", "how big", "what about" Then
            Say "The 5SG monitor has a 14 inch grayscale screen";
        Done
    Continue
EndTopic
Topic "Maker of 5SG" is
    Subjects "5SG", "maker";
    IfHeard "5SG", "it" Then
        IfHeard "who makes", "what about" Then
            Say "The 5SG monitor is made by MonitorTech";
        Done
    Continue
EndTopic
Topic "Price of 6SC" is
    Subjects "6SC", "cost";
    IfHeard "6SC", "it" Then
        IfHeard "cost", "how much", "what about" Then
            Say "The 6SC monitor is now available for $899";
        Done
    Continue
EndTopic
Topic "Size of 6SC" is
    Subjects "6SC", "features";
    IfHeard "6SC", "it" Then
        IfHeard "size", "how big", "what about" Then
            Say "The 6SC monitor has a 19 inch full-color screen";
        Done
    Continue
EndTopic
Topic "Maker of 6SC" is
    Subjects "6SC", "maker";
    IfHeard "6SC", "it" Then
        IfHeard "who makes", "what about" Then
            Say "The 6SC monitor is made by MonitorTech";
        Done
    Continue
EndTopic
```

Considering the two script programs above, several aspects of the scripting language become apparent. First, as designed, the script language uses language primitives that are very close to human natural language. Thus, this scripting language is easy to use by users that have no facility in programming languages per se. TABLE 2 is a BNF (Backus Normal Form) description of the present embodiment of the scripting language:

TABLE 2

BNF DESCRIPTION OF THE SCRIPTING LANGUAGE WITH COMMENTS

```
<Program> = <Statement>*
<Statement> = <Definition> | <Category>
There are two types of statements in a program: constant definitions and input
processing categories. All run-time processing of a user input is handled in the
categories.
    <Definition> =  <PatternDef> | <PatternListDef> | <CategoryListDef>|
                    <AttributeDef> | <OtherExampleDef> | <SubjectInfoDef>
    <PatternDef> = Pattern <symbol> is <string>;
```

TABLE 2-continued

BNF DESCRIPTION OF THE SCRIPTING LANGUAGE WITH COMMENTS

```
<PatternListDef> = PatternList <symbol> is <string> [, <string>*];
<CategoryListDef> = <CatListType> <symbol> is <string> [, <string>*];
<CatListType> = TopicList | ScenarioList | CategoryList;
<AttributeDef> =   Attribute <memref>; | Attribute <memref> specificity
                   <integer>;
<OtherExampleDef> = OtherExamples of <string> are <patlist>; |
                    OtherExamples of <string> WhenFocused are
                    <patlist>;
<SubjectInfoDef> = SubjectInfo <SubjectName> is
                      Replace <pronoun> with <replacement>
                      [, Replace <pronoun> with <replacement> |
                      , <pronoun> with <replacement>]*;
<SubjectName> = <string>
<pronoun> = <string>
<replacement> = <string>
```

Patterns are used to assign a name to a fixed string. The name can then be used in place of the string throughout the program, for readability and ease of modification. Similarly, a PatternList is used to assign a name to a list of strings, and a TopicList, ScenarioList, or CategoryList is used to assign a name to a list of category names (see below.) Attribute declarations are used to declare attributes so that information about them can be displayed through various debugging functions. Declaration of attributes is optional; attributes can be used without being declared. An attribute declaration can also assign a "specificity" value that is used when the attribute is tested using IfRecall or any matching condition. If an attribute is not delcared, or is not given a specificity value in its declaration, it is given the default specificity value of 2000. OtherExamples declarations define additional arguments for a particular example statement. These additional arguments are tested whenever the original example is tested using the automatic verification mechanism. An OtherExample declaration can also include the keyword WhenFocused to indicate that the arguments are context-sensitive examples.

A SubjectInfo declaration is used to assign pronoun replacement pairs to subjects, ordinarily subjects that have been assigned to one or more topics in the BOT script; the SubjectInfo declaration has no effect for subjects that are not defined. The pronoun and replacement can be any string. However, the invention is mostly commonly used for replacing the values of common English pronouns such as "he". It is illegal for the same pronoun to be included more than once for a given subject, or to declare subject information for a subject more than once.

```
<Category> = <Topic> | <Scenario>
<Topic> = <CategoryInfo> Topic <string> is <Tstatement>* EndTopic
<Scenario> =    <CategoryInfo> Scenario <string> is <Sstatement>*
                EndScenario
<CategoryInfo> = [Suppressed] [Priority | Default | Sequence]
```

A category is either a topic or a scenario. A topic is used to process user statements, while a scenario is used to process user actions. The terms "category" is used to generically refer to a topic or scenario.

Categories are divided into four types, priority, standard, default, and sequence, according to the label preceding the word "topic" or "scenario". A category that is not labeled is a Standard type. When the user makes a statement or takes an action, the categories in the program are executed, until a Done is reached (see below.) All priority categories are executed first, in the order in which they appear in the program. Next, all standard categories are executed. The order in which standard categories are executed changes dynamically depending on the execution of the program, and is described in the next paragraph. Finally, all default categories are executed, in the order in which they appear in the program. Sequence categories are executed only when explicitly accessed in a SwitchTo statement.

Standard categories are executed according to a "best-fit" matching mechanism, in which ties are broken according to an ordered list that initially corresponds to the order in which they appear in the program. When a standard category is executed, it, and other categories that share at least one Subject, is moved to the front of the standard category list (and so will be executed first on the next input.) The order of the standard category list can also be changed by commands within the program, as described below.

Categories can also be temporarily suppressed, in which case they are not executed at all. If the keyword Suppressed appears in front of the category definition, it is initially suppressed. Category suppression is discussed further below.

```
<Tstatement> = <MemoryLock> | <SubjectList> | <Tconditional>
<Sstatement> = <MemoryLock> | <SubjectList> | <Sconditional>
<Tconditional> =  <Condition> (<Command> | <Tconditional>)*
                     <TconditionalEnd>
                  <Tconditional> Otherwise <Tconditional>
<Sconditional> =  <Condition> (<Command> | <Sconditional>)*
                     <SconditionalEnd> |
                  <Sconditional> Otherwise <Sconditional>
<TconditionalEnd> = Done | Continue | NextTopic | Try Again | SwitchBack
<SconditionalEnd> = Done | Continue | NextScenario | Try Again | SwitchBack
```

The body of each category is a list of conditional blocks. These conditional blocks are executed in the order found in the category. If the condition of a conditional block is false, execution goes on the next conditional block in the category, or to the

TABLE 2-continued

BNF DESCRIPTION OF THE SCRIPTING LANGUAGE WITH COMMENTS next category if there are no further conditional blocks. If the condition is true, the
commands and conditional blocks inside the block are executed, and further behavior of
the program is dependent on the keyword which ends the conditional block. If it ends
with Done, execution ceases until the next input occurs (unless an InterruptSequence has
been executed; see below.) If it ends with Continue, execution continues with the next
conditional block in the category, or the next category if there are no further conditional
blocks. If it ends with NextTopic/NextScenario, the rest of the current category is
skipped and execution continues with the next category. If it ends with TryAgain, the
most recent WaitForResponse within the block is executed (it is an error to end a block
with TryAgain if it does not contain a WaitForResponse.) If it ends with SwitchBack,
execution resumes immediately following whichever SwitchTo statement switched to the
current block. It is an error to end a block with SwitchBack if the block is not inside a
Sequence topic.
    Conditional blocks can be combined using the Otherwise keyword; if the first
condition is true then the condition block(s) that follow the Otherwise keyword are not
executed. This behavior is similar to the behavior of an "else" command in C and similar
programming languages.
        <MemoryLock> = MemoryLock <memref> [,<memref>]*;
    The top level of a category may contain one or more MemoryLock statements.
Each MemoryLock statement asserts that the value of one or more associative memory
elements should only be changed within that category. If an associative memory key ?x
is MemoryLocked in a category C, it is an error for a program to assign a value to ?x
using Remember or Forget anywhere outside the category C, or to MemoryLock ?x in
some other category.
        <SubjectList> = Subjects <string> [,<string>]*;
    The top level of a category may contain one or more Subjects statements. Each
asserts that the given subjects are subjects of the topic. If a non-IF command within the
body of the topic is executed, all topics which share at least one Subject with the topic are
brought to the front of the focus of attention.
        <Condition> =    <SingleCondition> Then |
                          <SingleCondition> [and <SingleCondition>]* Then |
                          <SingleCondition> [or <SingleCondition>]* Then |
                          If <ConditionClause> [and <ConditionClause>]* Then |
                          If <ConditionClause> [or <ConditionClause>]* Then |
                          IfChance Then |
                          Always
    A condition can either be a basic condition (described below) or a Boolean
combination of basic conditions. A Boolean combination of basic conditions that
includes both and and or keywords must use parentheses to prevent possible ambiguity;
there is no built-in operator precedence between and and or in GeRBiL. The Boolean
not operator is implemented within the basic conditions; there is no explicit not keyword
that applies to conditions. Finally, there are two basic conditions that cannot be
combined using Boolean operators. The IfChance condition with no numeric argument
is a probabilistic condition that has the same likelihood of being true as all the other
argument-less IfChance statements immediately before or after it. Finally, the Always
condition is simply always true.
        <ConditionClause> =    <MatchLHS> <PosMatchKeyword> <MatchingList> |
                              <MatchLHS> <NegMatchKeyword>
                                  PosMatchingList> |
                              Heard <MatchingList> |
                              NotHeard <PosMatchingList> |
                              Recall <MemList> |
                              DontRecall <PosMemList> |
                              Chance <chance> |
                              (<ConditionClause> [and <ConditionClause>]*) |
                              (<ConditionClause> [or <ConditionClause>]*) |
                              {<ConditionClause> [and <ConditionClause>]*} |
                              {<ConditionClause> [or <ConditionClause>]*}
        <MatchLHS> = <string> | <memref> | <starbufref>
        <PosMatchKeyword> = Contains | Matches | ExactlyMatches
        <NegMatchKeyword> =    DoesNotContain | DoesNotMatch |
                              DoesNotExactlyMatch
    There are three basic types of condition clause. First, conditions using the match
keywords match a particular input pattern, mostly normally an element of the user memory,
such as the string said by the user, to some set of template patterns, which may contain
various "macro" characters, such as wildcard characters. Negated matching keywords,
such as DoesNotContain, are given their own special category, in order to prevent
"double negative" conditions. The Heard and NotHeard keywords are shortcuts
equivalent to the commonly used condition "?WhatUserMeant Contains". Second,
Recall and DontRecall are used to test whether elements of the user memory have been
set or not, and are most commonly used in practice for testing flags that are set by
libraries, for instance to indicate the type of question or statement that is being processed.
Third, Chance conditions are true or false at random with the given probability.
Condition clauses can also be combined using and and or as long as parentheses are used
to prevent ambiguity. The curly bracket symbols { } can be used to indicate that a
condition is optional.
        <SingleCondition> =    IfHeard <MatchingList> |

TABLE 2-continued

BNF DESCRIPTION OF THE SCRIPTING LANGUAGE WITH COMMENTS

```
                    IfNotHeard <PosMatchingList> |
                    IfRecall <MemList> |
                    IfDontRecall <PosMemList> |
                    IfChance <chance>
```
The single condition objects are equivalent in meaning to the analogous condition objects, except that the If keyword is combined with the condition keyword. In the present implementation, there are also certain cases where single condition objects can be substituted for condition clause objects.

```
    <MatchingList> = <MatchingListArg> [[and|&] <MatchingListArg>]* |
                     <MatchingListArg> [[and|&] <MatchingListArg>]*
                         [[and|&] not <MatchingListArg>]* |
                     <MatchingListArg> [[or|,] <MatchingListArg>]*
    <MatchingListArg> = <patlistobj> | (<MatchingList>)
    <PosMatchingList> = <PosMatchingListArg> [[and|&]
                             <PosMatchingListArg>]* |
                        <PosMatchingListArg> [[and|&]
PosMatchingListArg>]*
                             [[and|&] not <PosMatchingListArg>]* |
                        <PosMatchingListArg> [[or|,] <PosMatchingListArg>]*
    <PosMatchingListArg> = <patlistobj> | (<PosMatchingList>)
```
A matching list is a list of pattern list objects (single expressions evaluating to lists of strings; see below) separated by and, and not, or or. (The keyword and and the ampersand character (&) are interchangeable, as are the keyword or and the comma.) A matching list serves as the right-hand-side of a matching expression. Parentheses must be used to prevent ambiguity any time a memory reference list contains both and and or. Finally, a positive-only matching list does not allow the use of and not, in order to prevent double negatives such as "DoesNotContain X and not Y".

```
    <MemList> =   <MemListArg> [[and|&] <MemListArg>]* |
                  <MemListArg> [[and|&] <MemListArg>]* [[and|&] not
                      MemListArg>]* |
                  <MemListArg> [[or|,] <MemListArg>]*
    <MemListArg> = <memref> | (<MemList>)
    <PosMemList> = <PosMemListArg> [[and|&] <PosMemListArg>]* |
                   <PosMemListArg> [[or|,] <PosMemListArg>]*
    <PosMemListArg> = <memref> | (<PosMemList>)
```
A memory reference list is a list of one or more memory references separated by and, and not, or or. (The keyword and and the ampersand character (&) are interchangeable, as are the keyword or and the comma.) Parentheses must be used to prevent ambiguity any time a memory reference list contains both and and or. Finally, a positive-only memory reference list does not allow the use of and not, in order to prevent double negatives such as "DoesNotContain ?X and not ?Y"

```
    <Command> = Say <patlist>; | SayOneOf <patlist>; |
                Do <patlist>; | DoOneOf <patlist>; |
                SayToConsole <patlist>; | Trace <patlist>;
                Focus <catlist>; | Focus Subjects <string> [,<string>]*; |
                DontFocus; |Suppress <catlist>; | Recover <catlist>; |
                Forget <memlist>; | ForgetOneOf <memlist>; |
                Remember <memlist>; | RememberOneOf <memlist>; |
                Remember <memref> is <pathlist>; |
                Remember <memref> IsOneOf <patlist>; |
                Remember <memref> is Compute <FunctionName> of
                         <patlist>;|
                WaitForResponse; | InterruptSequence; |
                SwitchTo <string>; | SwitchTo <symbol>; |
                SwitchToOneOf <catlist>; |
                Example <patlist>; | InitialExample <integer> <patlist>; |
                SequenceExample <exampleindex> <patlist>;
    <FunctionName> = SpellCheck | URLEncoding | ReplacePronouns |
                     Capitalize | UpperCase | LowerCase
```
There are currently 26 basic commands. Say makes a statement to the user, while Do takes an action of some sort. (The possible arguments of a Do action are domain-specific.) SayOneOf and DoOneOf nondeterministically select one of their arguments, and Say or Do that argument. SayToConsole is a Say statement whose output is directed to the console window and log file. Trace is a Say statement whose output is directed to the console window and log file, and only appears when the script is being run in various debugging modes. Remember is used to assign values to associative memory elements; if a list of arguments is given with no is keyword, each argument is assigned an arbitrary non-empty value (currently the string "TRUE".) Remember can also be used to compute a function and assign its value to a memory element; currently implemented functions include spell-checking, URL encoding, pronoun replacement (according to pronoun-replacement pairs defined in SubjectInfo), and several string capitalization operations. Forget is used to un-assign values of associative memory elements. Once Forget ?x has been executed for some element ?x, ?x will have no value and will not cause an IfRecall statement to become true, until a Remember statement is executed for ?x. ForgetOneOf, RememberOneOf, and Remember..IsOneOf are the nondeterministic equivalents of Forget, Remember, and Remember..Is, respectively. Suppress takes a list of categories as arguments and suppresses each of its argument categories so that they are no longer

TABLE 2-continued

BNF DESCRIPTION OF THE SCRIPTING LANGUAGE WITH COMMENTS executed on any input. Recover takes a list of categories as arguments and reverses the effect of a Suppress command. Focus takes a list of categories as arguments and places them at the front of the ordered category list. Focus Subjects takes a list of subjects as arguments and places all categories which cover at least one of those subjects (as defined with a Subjects command in the top level of the category) at the front of the ordered category list. WaitForResponse halts execution in the same way as a Done statement but resumes at the same point on the next input. InterruptSequence can only be used within a Sequence topic, and temporarily halts execution of the current topic while all of the standard and default topics are executed. When a Done is reached, or when all of the standard and default topics are completed, execution resumes, without waiting for further input, within the Sequence topic. A SwitchTo command immediately transfers control of execution to the named category. A SwitchToOneOf command chooses one of its arguments at random and executes a SwitchTo on it. Example statements do not have any immediate effect, but are used in automatic verification.

<pat> = <string> | <symbol> | <memref> | <starbufref> | <pat> + <pat>

A pattern is anything that evaluates a string. It can be an explicit string (indicated with quotes), the name of a Pattern object, an associative memory reference, a reference to a "star buffer element" (set according to wildcard characters appearing in template patterns within pattern matching conditional statements), or a concatenation of any of the above.

<pathlistobj> =   <pat> | <symbol> | (<patlist>) | {<patlist>} |
                       <patlistobj> + <patlistobj>

A patternlist object is any single expression that evaluates to a list of zero or more strings. It can be single pattern, the name of a PatternList object, a PatternList enclosed in parentheses (also known as an "implicitly defined PatternList" since it is never explicitly given a name), a PatternList enclosed in curly brackets (indicating that the element or elements included within the brackets are "optional"), or a concatenation of any of the above. The value of the concatenation of two lists of strings is a list consisting of the concatenation of each element in the first list with each element of the second list. A symbol is a string of alphanumeric or underscore characters, beginning with a letter. Symbols are not case sensitive.

<patlist>= <patlistobj> [,<patlistobj>]*

A pattern list is anything that evaluates to a list of strings. It consists of one or more PatternList objects, separated by strings. Since each PatternList object may have a value that is a list of strings, the value of the PatternList is the value of all the elements appended together.

<catlist> = <catname> [,<catname>]*

<catname> = <string> | This | <symbol>

A category reference is either an explicit string containing the name of a category, the keyword This (referring to the category in which it appears) or the name of a CategoryList (or TopicList or ScenarioList) object. A category list is simply a list of categories or CategoryList objects separated by commas.

<memref> = ?<symbol> | ?<pat>:<symbol>

<memlist> = <memref> [,<memref>]*

A reference to the associative memory is normally indicated by a ? followed by the name of the key. Such references are normally particular to the user whose input is being processed. A reference to the associative memory for another user can be made by putting a pattern referring to the other user between the ? and the key. The reference to the other user is separated from the key by a colon. A memory reference list is simply a list of memory references separated by commas.

<starbufref> = #<integer> | *<integer> | %<integer> | &<integer> | *match

The "star buffer" contains the substring of an input string which matched each *, #, %, or & wildcard character in the template pattern in the most recent successful match. References to this star buffer consist of a symbol (*, #, &, or %) followed by a number. *n refers to the substring which matched the Nth * wildcard character found in the template, and so on. *match refers to the substring of the input string that matched the entire template pattern.

<chance> = <realnumber> | <realnumber>%

The argument of a Chance statement is either a real number between 0 and 1, interpreted as a probability, or a real number between 0 and 100 followed by a % sign, interpreted as a probability multiplied by 100.

<exampleindex> = <integer> [.<symbol>]*

The index for a SequenceExample statement is an integer followed by zero or more strings of alphanumeric characters, separated by periods.

The second aspect of the example script programs is that the scripts themselves embody a particular universe of discourse reflective of the subject matter concerning the site itself—e.g. a BOT for a site of a reseller of personal computer should "know" something about computers and their peripherals. These script programs are written in an action-response type style wherein the actual language supplied by the user embodies an "action" to which the "response" is written into the script program itself.

Scripts in the present embodiment are written generally by site administrators (human or otherwise) by defining a list of "categories" in which the site will be well conversant. Categories may comprise "topics" that are recognizable by the runtime executive. Topics, in turn, may comprise patterns or words that are matched against the stream of input communication (in either spoken or written or any other suitable form of communication) from the user.

To embody this knowledge into the runtime executive itself, the script programs are compiled by compiler 107 in FIG. 1. As previously mentioned, these script programs may be iteratively tweaked to improve the interaction with human users by a re-edit and re-compile process. It will be appreciated that compiler techniques sufficient to implement the above-listed BNF language description are well known to those skilled in the art and that the present invention should not be limited to any particular compiler techniques.

B. Runtime Executive Process

Figure 4:
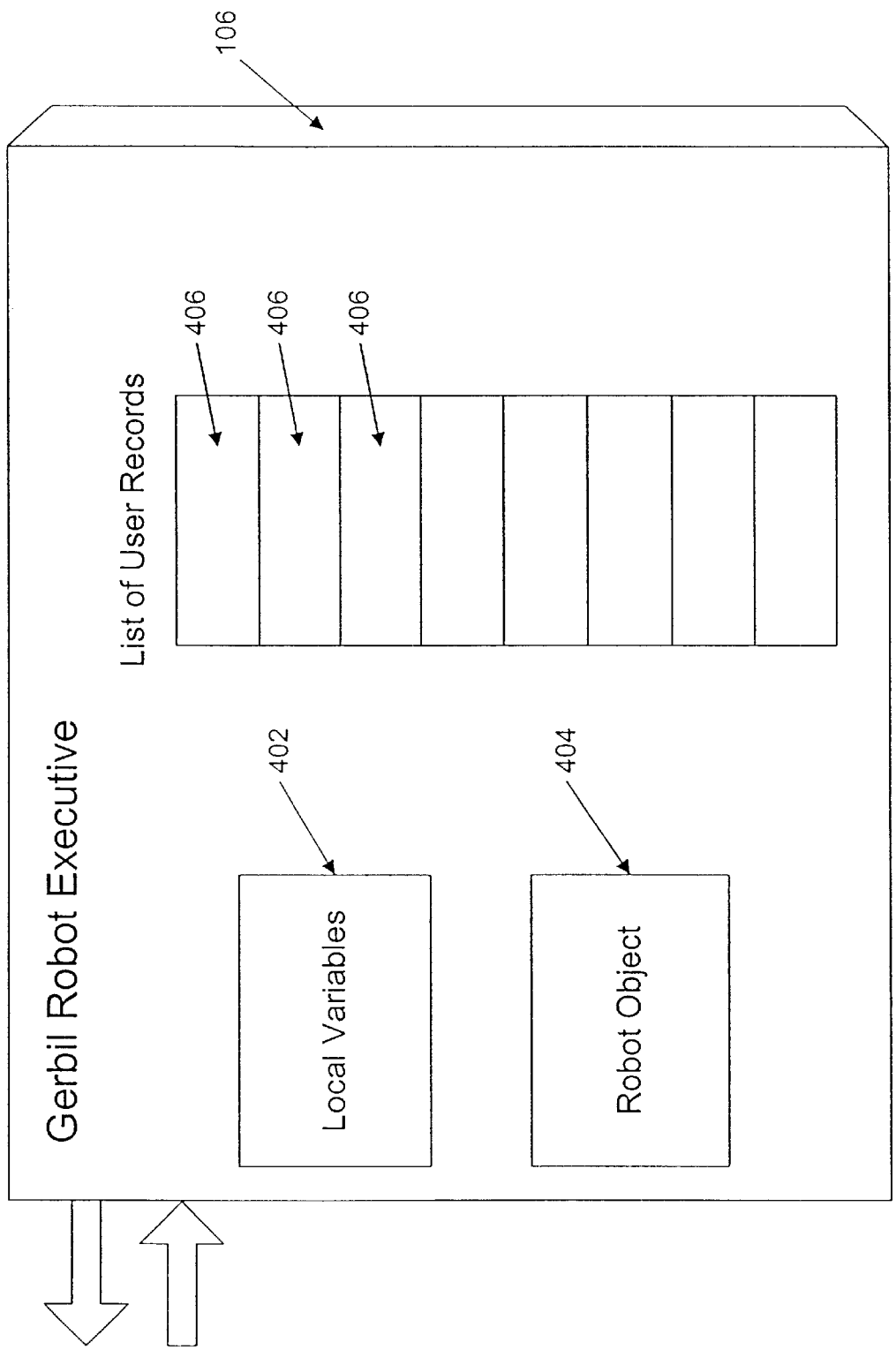
FIG. 4 expands the view of one embodiment of the runtime executive suitable for the purposes of the present invention.

FIG. 4 expands the view of runtime executive 106 of FIG. 1. Runtime executive 106 comprises local variables 402, robot object 404, and a list of user records 406. Robot object 404 is that part of runtime executive 106 that is incorporated by the compilation process described above. Although robot object 404 may be changed via the re-edit and re-compilation process as mentioned, during runtime, robot object 404 typically does not change whilst in conversation with user 116. The list of user records 406 is provided because the BOT processor could be in conversation with multiple users simultaneously and therefore needs to maintain the state of each on-going conversation. The state for each such conversation is maintained in a user record 406. Finally, runtime executive 106 maintains local variables 402 that are used during the processing of a single user input.

TABLE 3 is a listing of the C++ header file that embodies runtime executive 106.

```
================================================================
                TABLE 3 -- C++ HEADER FILE OF RUNTIME EXECUTIVE
================================================================ class CProgram
{
public:
        CExeStruct*                     ProgramExecutable;
        CMatcher*                       Matcher;
        CBFMatcher*                     BFMatcher;
        // holds all short-term run-time data
        CRunStruct*                     RunTime;
        CGRBLToolDoc*                   OwnerSession;
        FILE*                           m_pfRSP;
        CString                         CurrentInputString;
        // Registered attributes
        CTypedPtrMap<CMapStringToPtr, CString, CAttributeInfo*>
                        *m_pmspAttributeRegistry;
        // Subject information
        CTypedPtrMap<CMapStringToPtr, CString, CSubjectInfo*>
                                *m_pmspSubjectInfo;
        // User records now indexed by ID (SSB 12/17/96); we keep
        // around a map by name which is used only for reading
        // from logs. Each element is a CUserRec*
        CMapPtrToPtr            UserRecords;
        // Index names should now be all-lower-case, SSB 2/3/97
        // NOTE: Only use this when reading log files!
        CMapStringToPtr         UserRecordsByName;
        // Users that used to exist but have been destroyed. This might
        // actually contain IDs that are also in UserRecords since they
        // could have been recreated. The target elements of this map
        // are always NULL.
        CMapPtrToPtr            IdleTimeOutUsers;
        CMapPtrToPtr            TalkTimeOutUsers;
        // Number of users that are logged in. This is different from
        // UserRecords.GetSize( ) because (a) it doesn't include the robot,
        // console user, or test user, and (b) entries in the user record
        // map may point to NULL for users that have been deleted.
        int                             UserCount;
        // A user rec, in order to store things for the robot.
        // Actually, this has a lot of excess information,
        // such as an Attention Stack.
        // This rec may also (eventually) be in the general
        //user-list.
        // Added SSB 2/3/97
        CUserRec*                       RobotRec;
        // Shortcut to a special user used for testing; this user is in
        // the general user records list as well.
        CUserRec*                       TestUser;
        // Run-time options
        BOOL                            TraceOn;
        BOOL                            FullTraceOn;
        BOOL                            EchoOn;
        CategoryExecutionMode  ExecutionMode,
        // TestMode TRUE indicates that user state is saved in order to go back and
        // retrieve further categories that were activated by an execution. (This also
        // happens if ExecutionMode is EqualMatches or AllMatches.)
        // Used for Example mode and other debugging modes.
        BOOL                            TestMode;
        BOOL                            BEST_FIT_DEBUG;
        // whether it says anything when example answer is right
```

-continued

```
        BOOL                    CorrectExampleTrace;
// so we don't try to send out to clients.
        BOOL                    ReplayingLog;
        // in order to have output and report messages echoed to a report file,
        // set Reporting to TRUE and set m_strReportFileName.
        // will cause output to be printed to m_strReportFileName.
        BOOL                    Reporting;
CString                         m_strReportFileName;
        // Values for keeping statistics during Example testing
        int                     nExamplesRun;
        // correct answer not given, maybe others given
        int                     nWrongAnswers;
        int                     nExtraAnswers;
        // Run is bound to a particular session doc and view, and executes
        // either Topics or Scenarios. If TestMode is on, produces no
        // direct output.
        void Run(   CGRBLToolDoc*   ThisDoc,
                    CGRBLToolView*  ThisView,
                    LPCTSTR         TextLine,
                    LPCTSTR         UserName,
                    ULONG           UserID,
                    ULONG           ProtocolMessageType);
        // Runs all examples in a file or program.
        void RunAllExamples( CGRBLToolDoc*      Context,
                    LPCTSTR             InputFileName,
                    LPCTSTR             ReportFileName,
                    BOOL                bFindAllMatches,
                    BOOL                bEchoOn,
                    BOOL                bPrintAll,
                    BOOL                bTraceOn);
        void RunSequenceExample(CSequenceExample*   ThisExample,
                         CUserRec*           ExampleUser,
                         CGRBLToolDoc*       Context,
                         CGRBLToolView*      pSessionView);
        void RunExampleSet(  CExample*          ThisExample,
                         CUserRec*          ExampleUser,
                         CGRBLToolDoc*      Context,
                         CGRBLToolView*     pSessionView);
        void RunExampleInput( LPCTSTR           ExampleText,
                         CExample*          ThisExample,
                         CUserRec*          ExampleUser,
                         CGRBLToolDoc*      Context,
                         CGRBLToolView*     pSessionView);
        // Functions to summarize all the examples in the bot
        void SummarizeExamples(LPCTSTR FileName);
        void SummarizeExample(CExample* ThisExample, FILE* f);
        // Runs an attribute check
        void RunAttributeCheck(LPCTSTR InputText);
        // Performs "intelligent find-in-files"
        void LookForCategories(LPCTSTR InputList, int NumCategories, int Flags);
        CSearchPattern* ConvertPatternToSearchPattern(CString Pattern, BOOL Subword);
        // function which fetches the next category to be executed
        CCategory* GetNextCategory( CGRBLToolDoc* Context,
                            CUserRec* ThisUser,
                            CCatType ExecutionType,
                            CABlockEnd LastReturnVal);
        // Output interface between the Bot and the Connector. This now
        // outputs only to the robot, not to the console. The output message,
        // annotated with "Robot says", etc., are put in RunTime-
>RobotOutputSummary
        void RobotOutput(LPCTSTR TextLine,
                            ULONG    ThisUserID,
                            ULONG        MsgType);
        // Wrapper which uses the RunTime SayBuffer if needed
        void BufferedSay(LPCTSTR TextLine,
                            ULONG    ThisUserID,
                            ULONG         MsgType,
                            BOOL IsBuffered,
                            CArgListElem* ItemSaid);
        // produces appropriate trace messages for example mode.
        void HandleOutputInExampleMode(CAction*              Action,
                            CArgListElem*      OutputItem);
        // Output a line to the console. ALL output or potential output to
        // the console and/or log or report files should go through this function.
        void ConsoleOutput(OutputLineType MessageType,
                            LPCTSTR Message,
                            LPCTSTR SourceFile,
```

-continued

```
                int SourceLine);
        void ConsoleOutput(OutputLineType MessageType,
                                  LPCTSTR Message);
        void ConsoleOutput(OutputLineType MessageType,
                                        CConsoleData* MessageData);
    // pushes output to the console
        void PushConsoleOutput(ConsoleOutputType OutputType);
        void ClearConsoleOutput( );
        void PushConsoleOutputToString(ConsoleOutputType OutputType,
                                        CString&
OutputString);
        // version which bypasses all buffers and just prints it out.
        void DirectConsoleOutput(OutputLineType MessageType,
                                  LPCTSTR Message,
                                  LPCTSTR SourceFile,
                                  int SourceLine);
        void DirectConsoleOutput(OutputLineType MessageType,
                                  LPCTSTR Message);
        void DirectConsoleOutput(OutputLineType MessageType,
                                        CConsoleData* MessageData);
        // Creation of a new user
        CUserRec* CreateNewUser(ULONG UserID, LPCTSTR UserName);
        BOOL DestroyUser(ULONG UserID);
        // Reset user to initial state (of memory and attention stack)
        void RestartUser(CUserRec* ThisUser);
        // Returns TRUE iff the given user used to exist and does not now.
        // Returns FALSE if the user still exists or never existed
        BOOL UserTalkTimeOut(ULONG UserID);
        BOOL UserIdleTimeOut(ULONG UserID);
        // if there is a slot open, returns TRUE.
        // otherwise, if any users have been on too long, deletes the
        // oldest one and returns TRUE, otherwise returns FALSE.
        BOOL FindUserSlot( );
        // reset the name
        BOOL ChangeUserName(ULONG UserID, LPCTSTR NewName);
        // Finding of a user by ID
        CUserRec* FindUser(ULONG UserID);
        // And by name - only use this when replaying log files
        CUserRec* FindUserByName(LPCTSTR UserName);
        // Special functions are declared here...
        void DumpMemory(ULONG   ID);
        void PrintCurrentFocus(CUserRec* User, BOOL ShortPrint);
        // Prime the random number generator for this thread
        void PrimeTheRNG( );
        // Handle the refocusing component of the program execution
        void Refocus( );
        // Continuation help functions
        void SetupContinuation(CGRBLToolDoc* Context, CUserRec* ThisUser,
CContinuation* ThisContinuation);
        // Functions to Remember and Forget automatically-defined
        // attributes for the current user.
        void SetUserAttribute(LPCTSTR Key, LPCTSTR Value);
        void UnsetUserAttribute(LPCTSTR Key);
        // Automatic pronoun replacement
        BOOL ReplacePronouns(CString OriginalText, CString& FinalText);
        // Intelligent Tracing Functions
        void AddConditionTraceData(LPCTSTR Message,
                                  LPCTSTR SrcFileName, int SrcLine);
        void EnterIfFrame( );
        void EnterSwitchFrame(LPCTSTR Message, LPCTSTR SrcFileName,
                                  int SrcLine);
        void ExitIfFrame( );
        void ExitSwitchFrame(LPCTSTR Message, LPCTSTR SrcFileName,
                                     int SrcLine);
        void ExitAllFrames( );
        void AddTraceMsg(LPCTSTR Message, LPCTSTR SrcFileName,
                            int SrcLine, BOOL FullTraceOnly);
        void ActivateTrace( ); // equivalent to a null trace message
        void ActivateExampleTrace( ); // version for Examples mode.
        void ReplayTrace(BOOL FullTrace);
        int GetSize( );
        void PrintSize( );
        CProgram(CGRBLToolDoc* pgtd);
        ~CProgram( );
};
```

Figure 5:
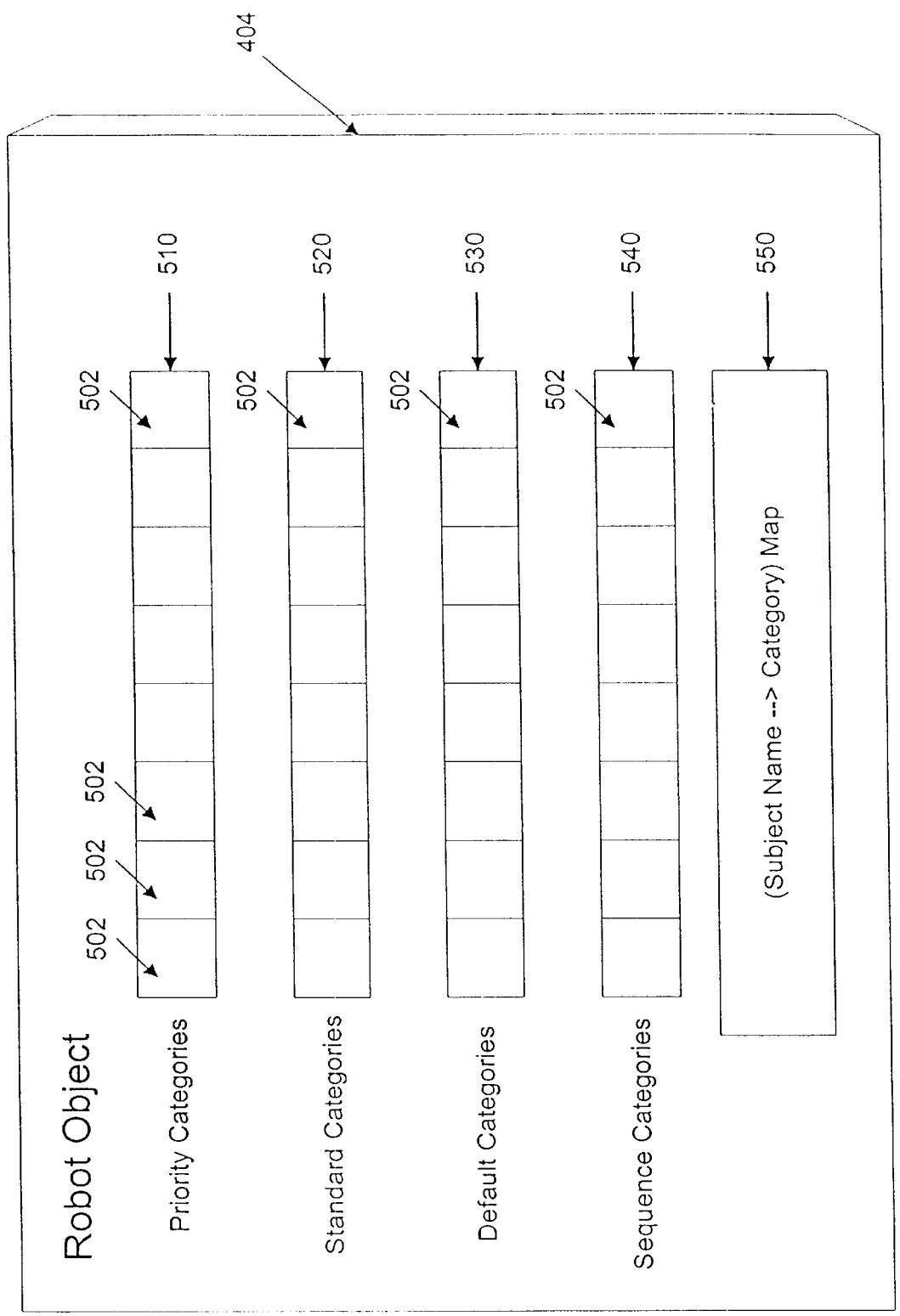
FIG. 5 expands the view of an embodiment of the robot object suitable for the purposes of the present invention.

In the code given in Table 3, robot object 404 corresponds to ProgramExecutable, which is of type CExeStruct. FIG. 5 expands the view of robot object 404 as shown in FIG. 4. Robot object 404 comprises several types of categories. These categories inherently maintain a priority by which runtime executive 106 processes inputs. For example, in FIG. 5, four types of categories are depicted: priority categories 510, standard categories 520, default categories 530, and sequence categories 540. When an input comes into the BOT processor, the input is processed through a series of categories. First, the priority categories are processed to determine whether there is a response that will be generated by the current input. These priority categories are processed, in the present embodiment, in the order in which they appear in the runtime executive. This order is currently selected in turn by the actual order in which PRIORITY TOPICS are found in the script program. This processing continues through the standard and default categories. Standard categories are executed according to the mechanism disclosed below. Default categories are executed in the actual order in which DEFAULT TOPICS are found in the script program. Sequence categories 540 are also included in the robot object 404 but are not executed unless explicitly executed by a SWITCH-TO statement as described below. In the present embodiment, sequence categories are typically employed to perform a number of pre-defined sequential communications with a user to effect a desired result. For example, having the BOT take an order for tickets to an event, how many such tickets, credit card information to purchase such tickets, etc. is readily implemented as a sequence category. Such a sequence category would be SWITCHed-TO if prompted by a user inquiry to buy tickets. It will be appreciated that other hierarchies of categories may be defined and order of execution selected. It suffices for the purposes of the present invention that some hierarchy of categories is defined and that the best fit mechanism as disclosed below be employed using one or more of such categories.

FIG. 5 also contains subject-name to category map 550, which describes the categories associated with each subject found in a SUBJECTS command in one or more categories. This map helps to implement the Focus Subjects command and automatic focus mechanism, as described below.

Figure 6:
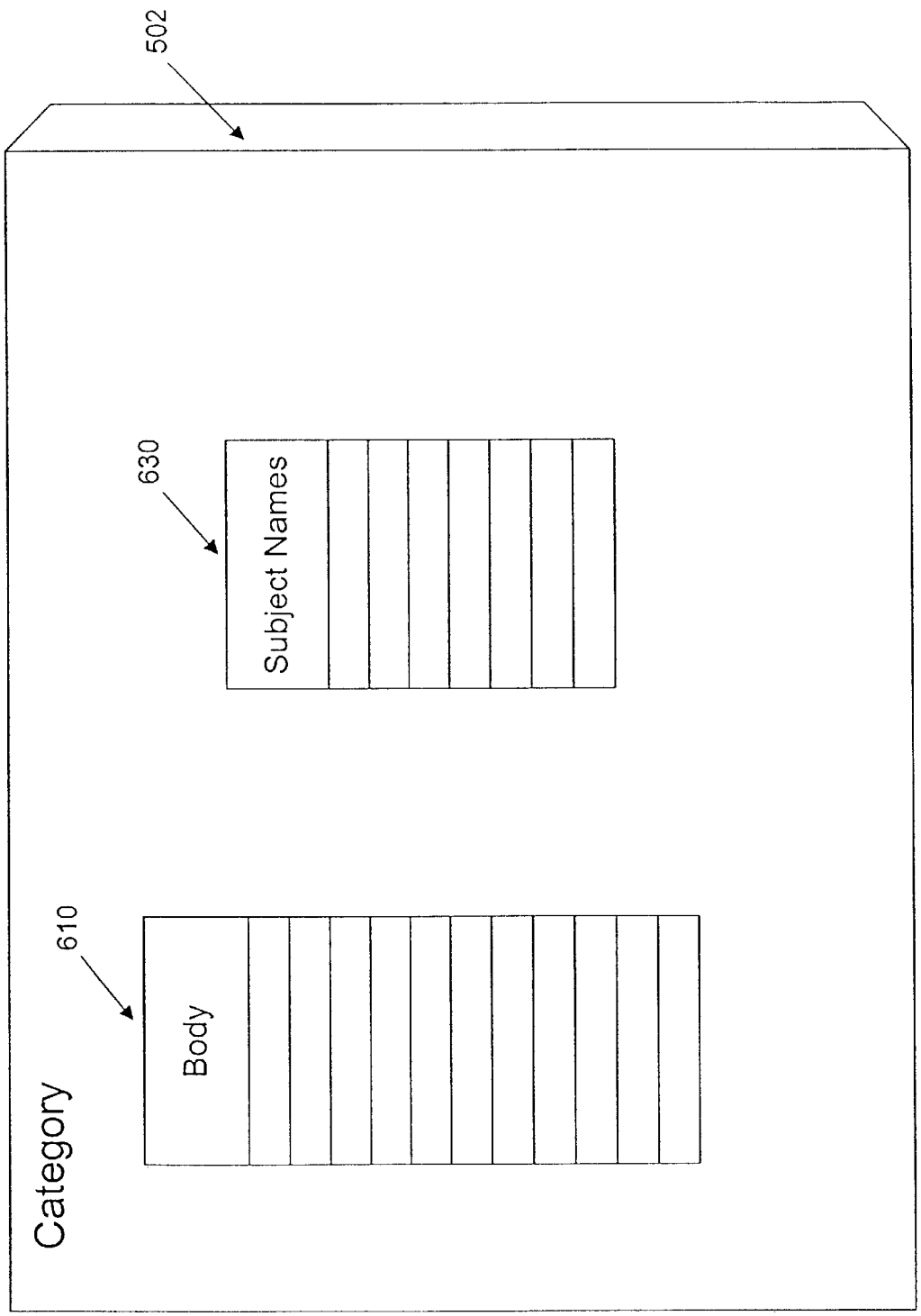
FIG. 6 describes the content of a category as embodied in a robot object.

FIG. 6 describes the content of a category 502. Category 502 comprises body 610 and subject names 630. Body 610 is a list of pointers to condition-action blocks. Such a condition-action block is a representation of an IF-THEN block found a script program. Subject names 630 are a representation of a listing of SUBJECTS that may optionally be found in a script program. As will be discussed in greater detail below, subject names 630 are used to focus the attention of the BOT processor on other categories similar to the category being processed.

Figure 7:
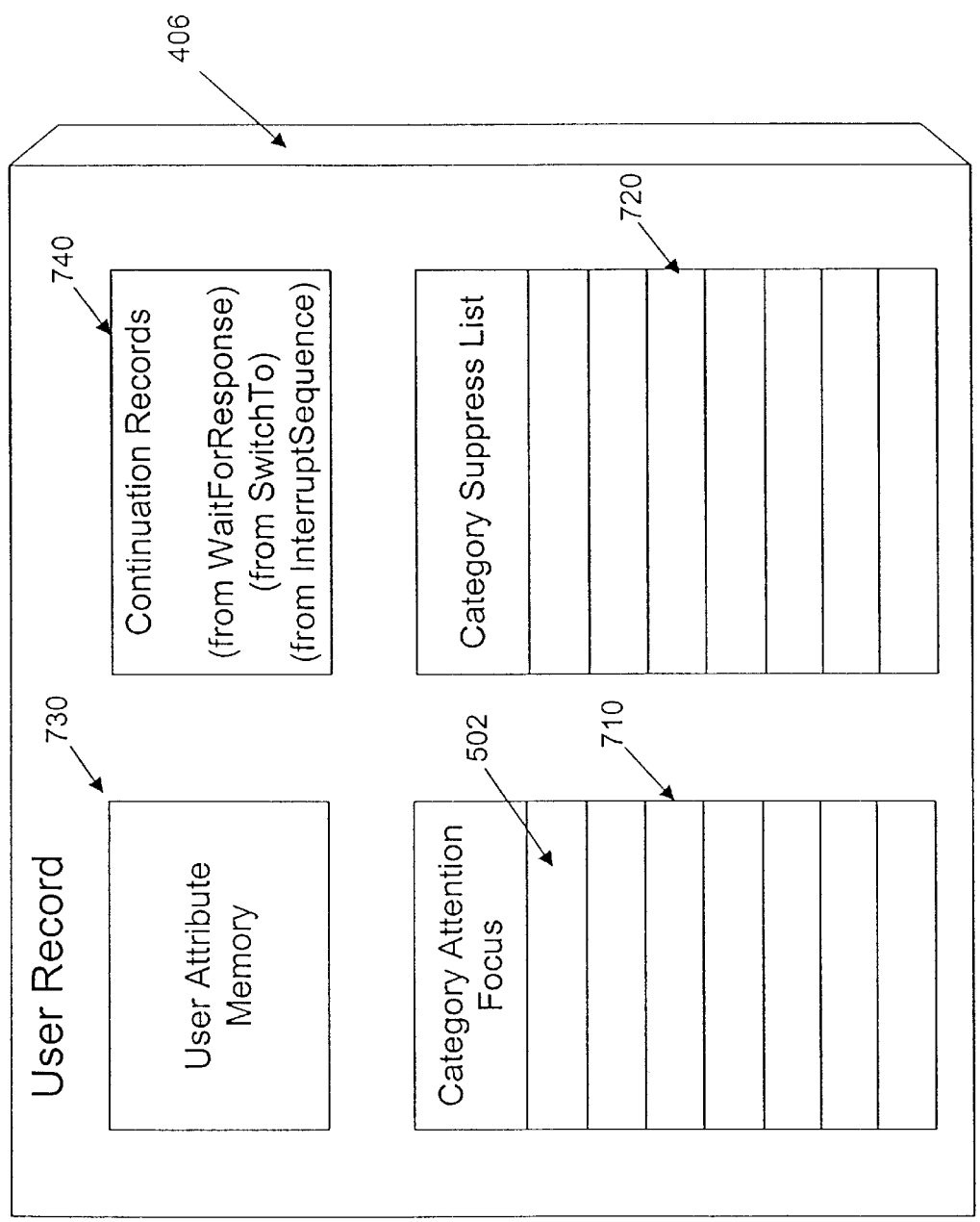
FIG. 7 expands the view of user record as shown in FIG. 4.

FIG. 7 expands the view of user record 406 as shown in FIG. 4. User record 406 comprises category attention focus list 710, category suppress list 720, user attribute memory 730, and continuation records 740. In the current embodiment of the present invention, attention focus list 710 is an ordered list comprising the standard categories 520 found in robot object 404. More generally speaking, however, an attention focus list could be implemented as a much broader list of any number of categories, as opposed to any single type of category. Indeed, for the purposes of the present invention, an attention focus list is an ordering of categories that, by virtue of their ordering, may affect the execution of an automatic interface program (i.e. BOT). It will be appreciated that all the "lists" and other structures mentioned herein could be implemented in a wide variety of well known data structuring techniques. For example, in the present embodiment, lists are implemented as CTypedPtrLists, however, lists can be readily implemented in hash tables, arrays, linked lists, or other known methods. Thus, the scope of the present invention should not be limited to specific data structure and algorithm techniques and should include all well known design and implementation variants.

The ordering of categories within the attention focus list 710 may be different for different users and reflects the state of the BOT processor's conversation with the particular user. The categories at the top of the list 710 represent areas of discourse in which the BOT processor is currently focused. In the present embodiment, when a new user begins communications with the BOT processor, the attention focus list 710 for that new user corresponds exactly to the standard categories list 520—which in turn corresponds to the order in which TOPICS are found in the script program. As conversation between the user and the BOT processor continues, this ordering of categories in attention focus list 710 is reordered according to the topics discussed by the user.

Category suppress list 720 is a list of categories that have been suppressed explicitly in the script program. Suppression of categories can occur a number of ways: suppressed categories may be initially listed as suppressed in the script program or categories may be subsequently suppressed by execution of a particular action in a script program. If the user touches upon a suppressed topic, then the suppressed category is not executed by the BOT processor. This suppress feature allows the BOT creator to have greater control over the BOT's "personality" as presented to the user.

User attribute memory 730 allows the BOT processor to remember certain attributes of the user that it has learned during the course of the conversation. For example, the gender, the telephone number, the credit card number, the address of the user may be particular fields found in user attribute memory 730.

Continuation records 740 are used primarily when the BOT processor has interrupted the execution of a category and may eventually wish to resume execution of said category. Such interruptions can occur as a result of a WaitForResponse statement (in which case the BOT processor has made a query of the user and is awaiting a response), an InterruptSequence statement (in which case the BOT processor has temporarily halted processing of the current category), or a SwitchTo statement (in which case the BOT processor may eventually return to the category containing the SwitchTo statement after executing a Switch-Back command.) At such a point, continuation record 740 maintains the location of the execution of the script in memory. Once the interruption is complete, execution continues at such location. It will be appreciated that there are other times in which it is desired to store such execution state.

Figure 8:
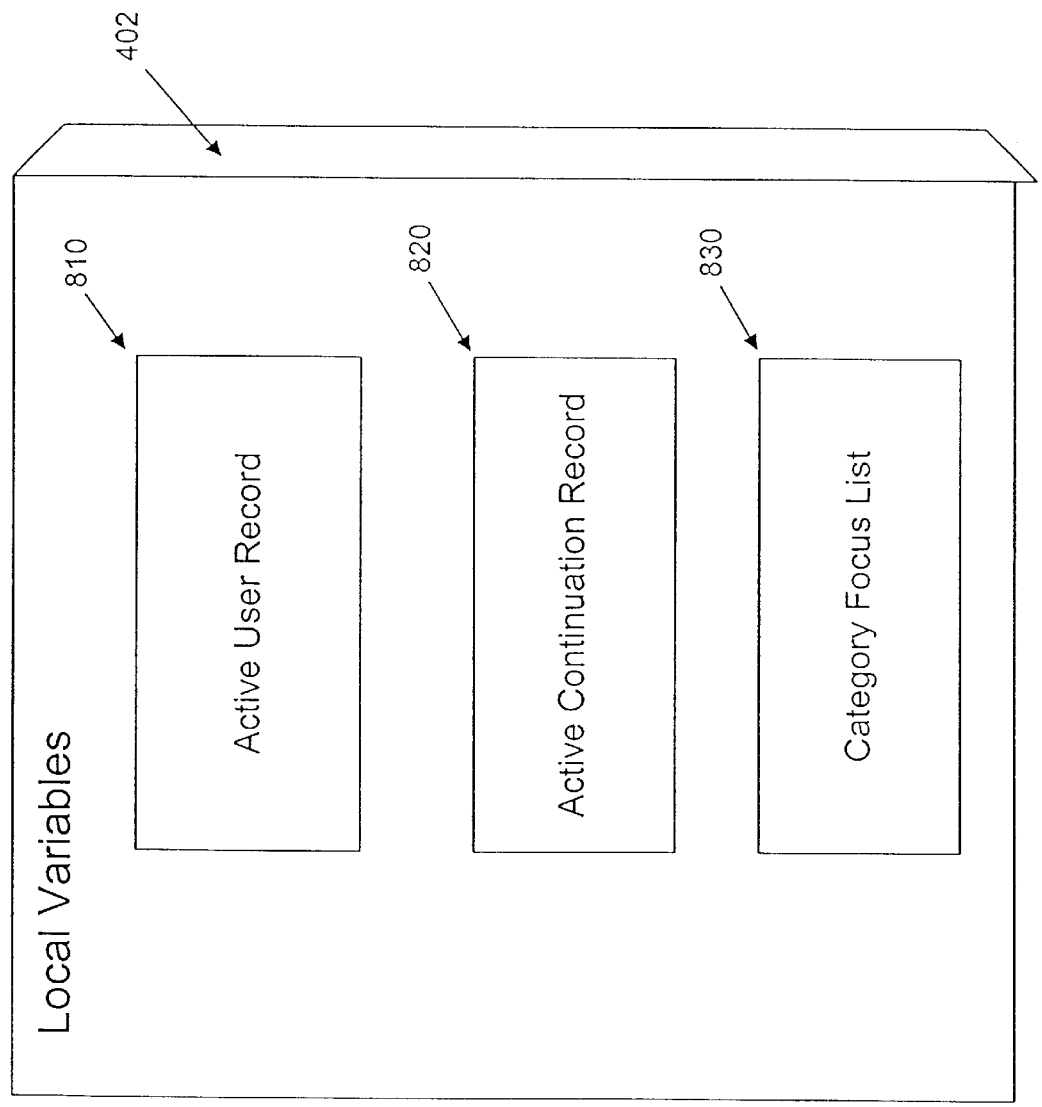
FIG. 8 expands the view of local variables as found in FIG. 4.

FIG. 8 expands the view of local variables 402 as found in FIG. 4. Local variables 402 comprise active user record 810, active continuation record 820, and category focus list 830. Active user record 810 is the user record 406 that corresponds to the user that is currently talking to the BOT processor. Active continuation record 820 is one of the continuation records 740, if any, that is copied over for the current execution. Category focus list 830 provides an intermediate store of recently activated categories and other categories associated with them. Categories are associated if they share at least one subject name as listed in 630 in FIG. 6.

III. Execution of Gerbil Programs

A. The Internal Structure of a Gerbil Program

Now a more detailed explanation of both the structure and the execution of Gerbil programs in the present embodiment will be given. There are three relevant member variables of the present embodiment of a Gerbil program (CProgram):

| | |
|---|---|
| CExeStruct* | ExeProg; |
| CRunstruct* | RunTime; |
| CMapPtrToPtr | UserRecords; |

The ExeProg contains an executable version of the Gerbil script. The RunTime structure contains variables that are used when executing the Gerbil script. The list of UserRecords (stored as a map from UserIDs to CUserRec structures) contains information specific to the state of the conversation with each user, such as any facts remembered about that user and the focus of attention for that conversation.

The CExeStruct contains the following relevant member variables:

| | |
|---|---|
| CCategoryList | PriorityCategories; |
| CCategoryList | DefaultCategories; |
| CCategoryList | SequenceCategories; |
| CCategoryList | StandardCategories; |
| CMapStringToPtr | m_pmspSubjectMap; |

Each CCategoryList contains a list of CCategory objects. Each CCategory contains a set of CConditionActionBlock objects, each with a condition and a list of CAction objects. A CConditionActionBlock is a type of CAction, so CConditionActionBlock objects can recursively contain other CConditionActionBlock objects. A CCategory also contains a list of all the subjects discussed by the category.

The lists PriorityCategories, DefaultCategories, and SequenceCategories are fixed in ordering and are shared among all users. Each user record contains a copy of the list StandardCategories (see below) in which the ordering of categories can dynamically change (according to the focus mechanism). The copy of StandardCategories in the CExeStruct is fixed in order and is used to create the initial copy of StandardCategories for each new user. Finally, the CExeStruct contains a map m_pmspSubjectMap from each subject name to the list of categories that discuss that subject.

In the present embodiment, the CRunStruct contains two relevant member variables:

CUserRec* User;

CTypedPtrList<CObList, CCategory*>FocusList;

It also contains a number of temporary pointer variables, including Continuation, ActiveCatPos, and SwitchToCategory, which are used in execution as described below. User is a pointer to the user record for the user involved in the current conversation. FocusList is used to store the list of categories that have been activated by the focus of attention mechanism during the current execution of the Gerbil script. It will be used at the end of the run to modify the focus of attention for the current user, as described below.

The CUserRec contains information about the current user and the robot's conversation with the user. In particular, it contains a CMapStringToPtr containing the contents of the memory for the user, in which each attribute name is mapped to a list of strings representing the value of that attribute, and six member variables relevant to the present mechanisms:

| | |
|---|---|
| CCategoryList | AttentionFocus; |
| CTypedPtrList<CObList, CCategory*> | SuppressList; |
| CContinuation* | Continuation; |
| CTypedPtrList<CObList, CContinuation*> | SwitchContinuations; |
| CTypedPtrList<CObList, CContinuation*> | SequenceContinuations; |
| CMapStringToString | m_mssReplacements; |

AttentionFocus is a copy of the StandardCategories list from the program executable that describes the attention focus for the Bot's conversation with the current user. The order of the categories in this list may be different than the order in StandardCategories, due to the functioning of the focus mechanism. SuppressList is a list of pointers to the categories that are suppressed in the robot's conversation with the current user. SuppressList may include categories from the PriorityCategories, DefaultCategories, and StandardCategories list. m_mssReplacements is a mapping from certain words to other words, used in implementation of the pronoun replacement mechanism disclosed below. Next, Continuation is NULL unless there is a WaitForResponse command that is currently active. In this case, Continuation points to a CContinuation structure that describes where in the script the WaitForResponse is located and how to resume execution from that point. Finally, the user record contains stacks of continuations that handle interruptions of a Sequence category and switches back from Sequence categories. SwitchContinuations contains a CContinuation for each SwitchTo statement for which a SwitchBack is still possible (much like the call stack in other programming languages), while SequenceContinuations contains a CContinuation for each sequence that has been interrupted by an InterruptSequence command and not yet returned. The functioning of these CContinuation stacks is described further below.

B. The Execution of a Gerbil Program

One main feature of a Gerbil program is its ability to "focus" categories for the express purpose of being more responsive to user communication. The "focusing" of categories, for the purposes of the present invention, is implemented by a combination of explicit and automatic methods. Explicit focusing can be accomplished in one of two ways in the current embodiment. The first focus mechanism, the "Focus" command, is added to the script program to explicitly focus a particular category when the command is executed. As will be explained below, "focusing" in the current embodiment moves the focused category to the front of the attention focus list. Thus, during the course of execution, the runtime executive will generally check the newly focused category earlier than it would have had the category not been focused. As an example, a sample Focus command might look like—Focus "dogs", "cats";— this command would move the category "dogs" to the front of the attention focus list and the category "cats" immediately following it. The Focus command is useful to make certain categories more immediate in the course of conversation and, in particular as to the above example, if the user had recently spoken of "pets".-

The second explicit focus mechanism, the "Focus Subjects" command, is similar to the "Focus" command but differs in that it will move a set of unspecified categories, each said category sharing a Subject whereby the Subject is explicitly listed within a "Subjects" command within the category. For example, in scripts example 2 above, the command—Focus Subjects "6SC";—could be placed in any category and if said command is executed, then all categories explicitly listing "6SC" (i.e. in example 2, these categories are: "Price of 6SC", "Size of 6SC", and "Maker of 6SC") will be placed to the front of the attention focus list. This command is useful to focus related categories without having to explicitly list them all.

In addition to these explicit focus mechanisms, there is an automatic focus mechanism that works without use of explicit commands. If a category is activated by matching an input pattern with a pattern made explicit in a category, or by matching a value of a user memory element with a pattern made explicit in a category, or by executing a statement within the category, then that category is moved to the front of the attention focus list. Additionally, in the current embodiment, if that category contains a Subjects command, then all other categories which share at least one of the arguments of the Subject command are also moved to the front of the attention focus list. It will be appreciated that other protocols could be observed upon automatic focusing of a category.

Another, somewhat related mechanism, "Suppress", is implemented in the current embodiment. "Suppress" is an explicit command that disables the activation of the categories named in the command for the remainder of the course of conversation with that user. Such categories can be placed back into consideration with the use of the "Recover" command. For example, the command—Suppress "dogs";—will suppress the category "dogs" from further discussion, even if an explicit Focus command would purport to move it to the front of the attention focus list.

Now a more detailed description of the current embodiment will be discussed. During execution, each Gerbil command in the present embodiment actually returns a CABlockEnd value that describes what the program should do following the command. This value is normally Continue, indicating that the program should continue by executing the next Gerbil command. It can also be one of the values Waiting, Done, NextCategory, Switch, SwitchBack, NotActivated, or RunTimeError. (The Done, Continue, and NextTopic "terminators" that appear at the end of a condition block in a Gerbil code are actually implemented as commands that do nothing other than return the appropriate CABlockEnd value.) In this context, the following is a discussion concerning six Gerbil commands that are relevant to the focus of attention mechanism: Focus, Focus Subjects, WaitForResponse, TryAgain, InterruptSequence, and SwitchTo.

Each Focus command in a Gerbil script has as arguments a list of categories. This list is converted by the compiler into a list of pointers to the actual categories. When the Focus command is executed, these pointers are copied to the end of the RunTime->FocusList structure (to later be brought to the front of the attention focus list.) The C++ code for CFocus::Execute is straightforward and is shown below.

```
POSITION pos = ArgValues.GetHeadPosition( );
for (; pos != NULL;) {
    ArgCategory = (ArgValues.GetAt(pos))->Category;
```

-continued

```
    ArgValues.GetNext(pos);
    if(ArgCategory != NULL) {
        TRACE("Putting Category \"%s\" on focus list\n",
            ArgCategory->Name);
        Context->m_ppProgram->RunTime->FocusList.AddTail(
                                                ArgCategory);
    }
}
return Continue;
```

In order to execute a "Focus Subjects" command, the robot executive takes each argument and uses the map m_pmspSubjectMap found in the CExeStruct to determine which categories share that subject. Each of the categories contained in the m_pmspSubjectMap under the subject name is appended to the end of RunTime->FocusList.

The WaitForResponse command causes execution on the current input to stop, but before that, sets up a CContinuation telling the Gerbil program where to restart when the next input is processed. This CContinuation is created by the compiler and stored in the CWaitForResponse statement. The code for CWaitForResponse::Execute is trivial; it simply copies the CContinuation pointer into RunTime->User->Continuation and returns Waiting.

A TryAgain command is simply a special case of WaitForResponse in which the CContinuation starts from the previous WaitForResponse rather than the TryAgain command. A TryAgain command is converted into an appropriate CWaitForResponse by the compiler.

An InterruptSequence command can only be used within a Sequence category, and causes the execution of the category to be suspended while all of the standard and default categories are executed. (InterruptSequence can only be used after a WaitForResponse, to prevent possible conflicts in which a category might be executed twice.) It is implemented by adding a CContinuation to the top of the SequenceContinuations stack (allowing nested interruptions within interruptions) and returning the value NextCategory.

Each SwitchTo command in a Gerbil script has the name of a single category as an argument. Again, this category name is converted into a pointer by the compiler. When the SwitchTo command is executed at run-time, this pointer is copied into a member variable RunTime->SwitchToCategory and the value Switch is returned. Furthermore, a CContinuation representing the SwitchTo is copied into User->SwitchContinuations so that the category can be resumed if the target category ends with a SwitchBack. The fact that User->SwitchContinuations is a stack allows arbitrarily deep series of SwitchTo and SwitchBack calls.

In order to prevent cycles in which a category in the attention list is repeatedly executed and then SwitchedTo from another category later in the attention list, the present embodiment of the program checks to make sure that the category has not already been executed before returning any value. If it has already been executed, the value RunTimeError is returned instead. Such cycles can only occur with standard categories. The compiler will check all sequence categories and guarantee that cycles among them will not occur. This is done by viewing each category as a node in a graph and each SwitchTo as an arc, and doing depth-first search to detect cycles in the graph. A WaitForResponse before the SwitchTo eliminates the arc caused by that SwitchTo, as it will prevent cycles from occurring while processing a single input. The C++ code for CSwitchTo::Execute is shown below. The SwitchToOneOf command is a straightforward extension of SwitchTo.

```
        CCategory* DestCategory = Destinations[selection]->Category;
        ASSERT(DestCategory != NULL);
        if((DestCategory->Executed) && (DestCategory->Priority !=
SequencePriority))
        {
                // run-time error to switch to an already-executed non-sequence
category
                Context->m_ppProgram->PrintTraceMsg("ERROR",
SrcFileName,
                                                    SrcLine);
                return RunTimeError;
        }
        // record what category is being switched to in the run-time data structure
        Context->m_ppProgram->RunTime->SwitchToCategory = DestCategory;
        // and remember where it was called from
        Context->m_ppProgram->RunTime->User-
>SwitchContinuations.AddHead(
                m_pccCallingLocation);
        return Switch;
```

The next level of structure above single commands in a Gerbil script is a CConditionActionBlock. A CConditionActionBlock consists of a condition and a body consisting of a list of commands. When the CConditionActionBlock is executed, the condition is first evaluated. If it is false, the block returns NotActivated immediately. Otherwise, the body statements are executed in order (normally starting with the first statement, but starting with a later statement if the block is part of an active Continuation) until one returns a CABlockEnd value other than Continue. When some other CABlockEnd value is returned, it is passed on as the return value of the CConditionActionBlock.

A CCategory contains an ordered list of CConditionActionBlock objects, and is executed by executing the blocks in succession (normally starting with the first block, but starting with a later block if the CCategory is part of an active Continuation.) If a block returns the value NextCategory, Switch, SwitchBack, Waiting, Done, or RunTimeError, execution of the CCategory stops and the return value is passed on. If a block returns NotActivated, the next block is executed. If a block returns Continue, the next block is activated unless it is an Otherwise block or unless both the current and next blocks are IfChance blocks, in which case it and all other IfChance blocks immediately following it are skipped. If the last block in the category returns Continue or NotActivated, execution of the category is complete and the value NextCategory is returned. Meanwhile, if the category is a standard category, any output command (currently all variants of "Say" or "Do") will cause a flag to be set in the category. If this flag is set at the end of CCategory::Run, the category is appended to the end of RunTime->FocusList so that it will be automatically moved to the front of the focus of attention list. This automatic focus allows the attention focus mechanism to function even without the use of Focus statements. It will be appreciated that other implementations might decide whether a topic should be automatically focused in a different way, for example by automatically focusing on any topic in which the condition in at least one CConditionActionBlock has value true, or any topic in which any action is executed.

This behavior can be overridden by including the command DontFocus in any of the blocks that should not trigger the automatic focus mechanism. Furthermore, if the category is given a list of SUBJECTS in the Gerbil script, when the category is focused using automatic focus, all other categories that share at least one SUBJECT with said category are also appended to the end of RunTime->FocusList and will be automatically moved to the front of the focus of attention list.

When a user enters an input, the function CProgram::Run is called. This function does a number of low-level tasks (such as setting RunTime->User) and then executes the Gerbil program. First, it clears FocusList so that it can keep track of categories that are focused on during the execution. To prevent possible ambiguities in the ordering of category executions, Focusing actions do not have any effect until the script is finished executing on the current input. It will be appreciated that other implementations of an attention focus mechanism might dynamically reorder the attention focus list during the processing of an input.

The CProgram is executed by repeatedly selecting and executing categories, as shown in the code fragment below from CProgram::Run. RunTime->ActivePriority and RunTime->ActiveCatPos are used to keep track of what category is currently being executed. Once execution is complete, RunTime->FocusList is used to move those categories that were activated or focused on during execution to the front of the Focus of Attention, focusing the robot's attention on these categories. The function CProgram::Refocus itself is straightforward, simply going through RunTime->FocusList, and for each element, removing it from its previous position in the attention focus list and placing it at the front of the list.

```
// mark all categories as un-executed
ThisUser->AttentionFocus.MarkUndone( );
ProgramExecutable->PriorityCategories.MarkUndone( );
ProgramExecutable->DefaultCategories.MarkUndone( );
ProgramExecutable->SequenceCategories.MarkUndone( );
// Clean up focus list and do a bunch of other initialization tasks
```

-continued

```
RunTime->InitializeForRun( );
// Execute all of the categories, in order.
CABlockEnd ReturnVal = NextCategory;
CCategory* ActiveCategory = GetNextCategory(ThisDoc, ThisUser,
                                  ExecutionType, ReturnVal);
while (ActiveCategory != NULL) {
    ReturnVal = ActiveCategory->Run(ThisDoc);
    ActiveCategory = GetNextCategory(ThisDoc, ThisUser, ExecutionType,
                                  ReturnVal);
}
// (other tasks done here such as handling output buffers)
// handle all focusing actions
Refocus( );
```

Most of the work involved in deciding which categories to execute is done inside of CProgram::GetNextCategory. GetNextCategory uses RunTime->ActivePriority, RunTime->ActiveCatPos, and the ReturnVal from the previous category, and selects the next category to execute. If ReturnVal is NextCategory, the program will simply select the next category from the CategoryList for the current ActivePriority (Priority, Standard, or Default), according to the selection mechanism operative for that category and switching to the next priority level if necessary. (Recall that the Priority and Default categories are found in the CExeStruct, while the standard categories are found in RunTime->User->AttentionFocus. Sequence categories are never executed unless activated with a SwitchTo command, so the list ExeProg->SequenceCategories is never executed directly.) If there is an active CContinuation remaining from a previous execution (due to a WaitForResponse), it is activated immediately after the Priority categories. CContinuations are activated by returning the appropriate category and setting RunTime->Continuation, which will cause execution of the category to begin at the appropriate place within the category rather than the beginning.

If ReturnVal is Switch, the target category (from RunTime->SwitchToCategory) is selected, and if the target category is a Standard category, RunTime->ActiveCatPos is set as well. If ReturnVal is SwitchBack, the first CContinuation from SwitchContinuations is removed from the stack and used to choose a category and set up a continuation. (Since SwitchBack can only be used within a Sequence category, there is guaranteed to be at least one continuation in SwitchContinuations. The process is equivalent to the method of returning from a subroutine in other programming languages.) If ReturnVal is Waiting, execution ceases since a WaitForResponse has been executed. Similarly, if ReturnVal is RunTimeError, execution ceases and the stack of SwitchContinuations and SequenceContinuations is cleared. (RunTimeError is presently returned only in the event of a SwitchTo cycle violation.) Finally, if ReturnVal is Done (recall that a category cannot return value NotActivated or Continue), execution stops unless there was an InterruptSequence that has not yet been resumed. Recall that InterruptSequence stops execution of a Sequence category while all of the Standard and Default categories are executed, and then resumes execution of the Sequence category. Therefore, if a Done is reached while there is at least one CContinuation in the SequenceContinuations stack, that Sequence category is resumed. In the case where there is no SequenceContinuation, the SwitchContinuations stack can also be cleared, as there is no possibility of returning from any SwitchTo statements once a Done (that is not ending an interruption) is executed.

IV. Implementation of Automatic Response Selection

A. Overview

The mechanism for automatic selection of an appropriate response does not require the BOT author to change the BOT scripts in any way. The BOT author simply writes routines to respond to inputs in the natural way, and the mechanism handles resolution of situations in which an input matches multiple conditions. The BOT author can also add "optional" elements to a condition that do not change whether the condition is true but may affect the automated response selection.

In one embodiment of the invention, Priority and Default categories allow the BOT author to implement initial filters and default handlers for the input, as well as any response generation that the BOT author wishes to have handled by conditions that are explicitly ordered. Sequence categories also function as described, being executed if and only if they are explicitly switched to by another executed category. The mechanism for automatic response selection functions on all other categories in the BOT script. It would be obvious to one skilled in the art that the automatic response selection mechanism could also be applied to other types of categories, and that the scope of the present invention should not be limited to any particular method of partitioning the set of categories in the BOT script.

In response to an input, we consider a category "activated" if one or more base-level statements (i.e. statements other than IF conditionals) would be executed if the category were executed. When the BOT script is compiled, the compiler builds a data structure that can be used to map an input and BOT state to the set of all categories that are activated by that input and BOT state. At run-time, this structure is used to generate a list of all activated categories and to assign a numerical measure of appropriateness (variously termed "specificity" throughtout the description or, more generally, a "metric") to each category. The category with the highest appropriateness value is executed; in the current implementation, ties are broken according to some selection function, such as the aforementioned Focus mechanisms. If this category executes a Done statement, execution is complete, else the process is repeated, excluding any already-executed categories, and a new category is chosen. If at any step of this process (including the first step), no new categories are generated and a Done has not yet been executed, execution switches to the Default categories and proceeds in the standard manner.

It will be appreciated that other implementations of the above mechanisms are possible. For example, the BOT could apply the numeric measure or metric to each category defined within the BOT without regard to activation of categories. As suggested above, the activation status of categories could be computed concurrently with the computation of the measure or metric; or these steps could be performed separately. The present invention should not be limited to any one such implementation and the scope of the present invention explicitly includes these obvious implementation variants.

B. The Specificity Measure for Conditions

The present implementation of the invention computes the appropriateness of a particular response based on the estimated likelihood of the condition or conditions that suggested that response. Conceptually, the system computes the most specific condition that matched the input. For instance, the condition that looks for the pattern "you*sales bot" is more specific than the condition that looks for the pattern "you*bot". The "*" is a wildcard symbol that can match zero or more words. This measure, known as "specificity", is based on $\log(1/f)$ where f is the estimated likelihood, over all expected inputs to the system, that a condition is true for any particular input. In the present implementation, specificity is multiplied by 1000 to allow the computations to be done using integers. This inverse frequency measure correspond to the idea that a "more specific" question is composed of more and/or more unusual words than a "less specific" question. It will be appreciated that other measures of the specificity of a condition, including other formulas based on condition frequency or estimates derived directly from an explicit domain description, could be used and that the present invention should not be limited to the specificity measure described above.

The frequency of conditions, f can be estimated in a variety of ways; for instance, words can be considered uniformly likely, a preset dictionary of word frequencies can be used, or word frequencies can be computed based on likely inputs to the BOT script. In the present implementation, base-level Recall conditions (conditions that test whether a boolean attribute is set for the given user record) are arbitrarily assigned a frequency of 0.25 (since it is difficult in general to compute the likelihood of an attribute being set), while base-level matching conditions are assigned a frequency based on the frequency of words in the Example statements found in the BOT script, since these Example statements are intended to represent a reasonable sample of the inputs that the BOT script is expected to handle. Example statements are additionally used in the validation and verification of operation of a virtual BOT, as is more fully discussed in co-pending and co-assigned patent application entitled "Systems and Method for Automatically Verifying the Performance of a Virtual Robot (as amended)", filed Feb. 3, 1998, Ser. No. 09/017,760; and herein incorporated by reference.

If a matching condition is testing an input for a particular word, the frequency of that condition is the frequency of that word within the set of Examples. If it is testing an input for a partial word (such as a word beginning with the string "develop"), the frequency is the combined frequency of all words in the set of Example that match the partial word. If it is testing an input for a string of words, the frequency is the product of the frequencies of the individual words; it will be appreciated that other metrics, such as a true count of the frequencies of word pairs, could be used instead.

In the present embodiment, compound conditions (conditions composed of disjunctions or conjunctions of base-level conditions) are assigned specificity values based on the specificity of their child conditions. The specificity of a disjunction of one or more conditions is equal to the highest specificity values from among the true children, while the specificity of a conjunction of one or more conditions is equal to the sum of the specificity values of all children, reduced by a fixed constant (currently 1000) for each child beyond the first, reflecting the fact that conditions tested together tend to be correlated. It will be appreciated that computing the specificity of conjunctions or disjunctions can be accomplished in a myriad of variations, the only requirement being that the essential meaning of 'and' and 'or' be preserved such that compound conditions composed of conjunctions return a value at least as high as the value returned for a similar compound condition composed of disjunctions.

A similar method is used in computing the specificity of conditions that involve PatternLists or optional elements. The matching of a PatternList has the specificity of the most specific element of the list that actually matched the input, while the specificity of an optional element or condition is zero if it is not true, and its normal specificity if it is. Therefore, the BOT author can include optional conditions that do not affect whether a condition is matched, but make it more likely that the condition will be chosen if the optional condition is true.

b 1. Compilation of the Category Selection Table

The first step in the compilation process is to compile the BOT script into executable structures, using standard compilation techniques well-known to those skilled in the art. Once the set of executable categories has been created, the standard categories are further compiled into a data structure (CBFMatcher) that is used to compute the set of active categories and select among them.

Once the categories have been compiled, the compiler identifies all "base-level blocks" in the categories. We define a "base-level block" as an IF block that contains at least one non-IF statement at its top level; it may contain other IF blocks as well. Normally, each base-level block corresponds to an action (Say or Do) taken by the BOT, although it might instead be some other statement such as Remember. In the code fragment below, the block beginning IfHeard "bot" and the block beginning IfDontRecall are both base-level blocks, as is the block beginning If ?WhatUserSaid Matches "are *", which contains a SwitchTo statement at its top level. The block beginning IfHeard "you" is not a base-level block, as it contains no statements other than another If block.

```
Topic "Are you a bot" is
    IfHeard "you" Then
        If ?WhatUserSaid Matches "Are *" Then
            IfHeard "bot" Then
                Say "Yes, I am a bot";
            Done
            SwitchTo "Are you X";
            // The following will be executed if "Are you X"
            // executes a SwitchBack
            IfDontRecall ?AnsweredQuestion Then
                Say "I don't know";
            Done
        Continue
    Continue
EndTopic
```

An IF block is said to be "active" if its condition is true and the conditions of all IF blocks containing that block are also true; in other words, the statements in the block would be executed if the category containing the block were executed in the standard fashion, and no Done, NextTopic, or SwitchTo statements were executed earlier in the block.

Each block is made true by some condition, which can be expressed in terms of disjunctions and conjunctions of base-level conditions, where each base-level condition is either the testing of a memory attribute (IfRecall or IfDontRecall) or a single pattern-matching operation. For the purposes of category selection, IfChance conditions are treated as always true and thus are not included in the condition set.

Figure 9:
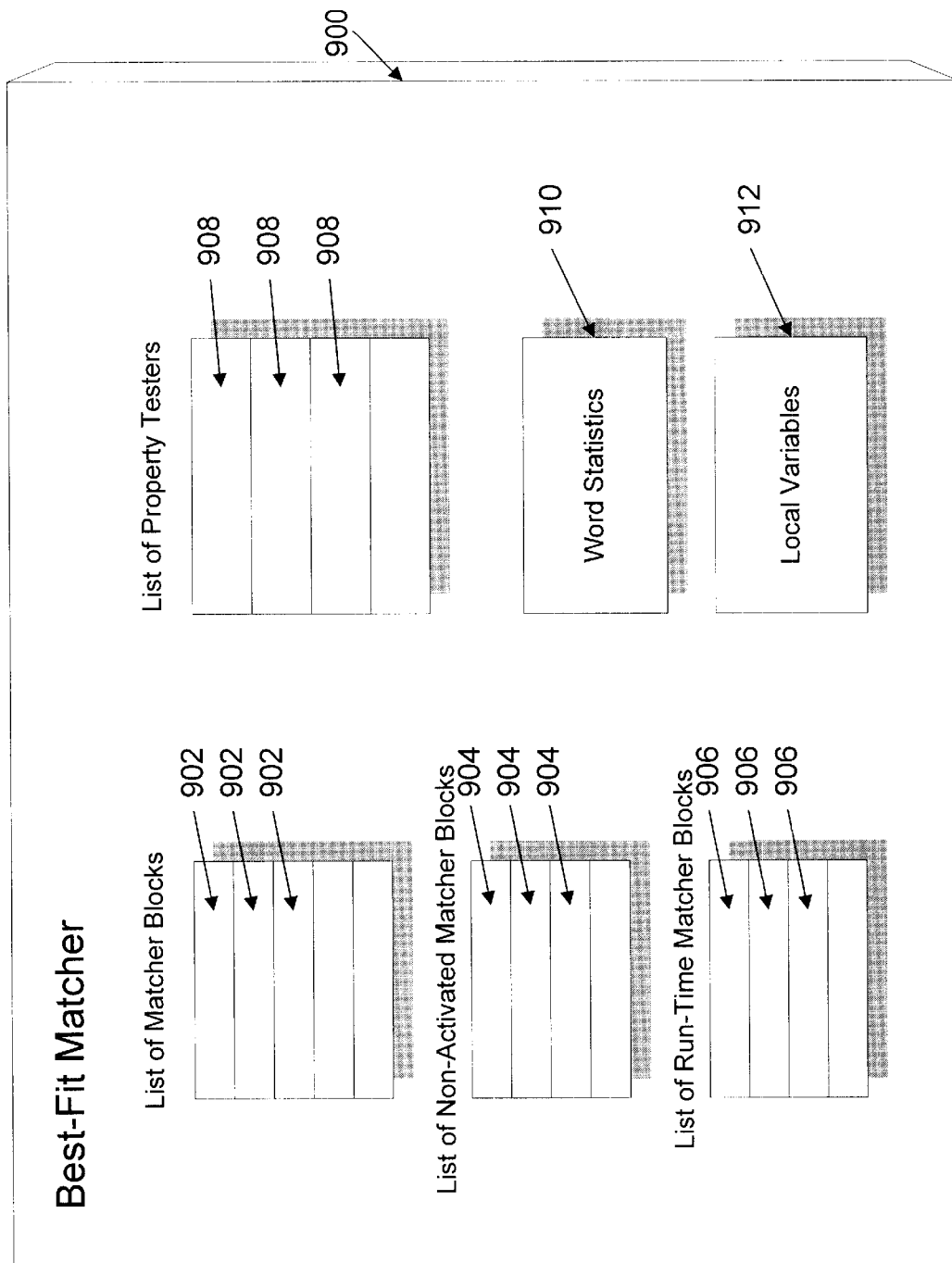
FIG. 9 shows a view of one embodiment of a program object that is used to select a category given a user input, suitable for the purposes of the present invention.

FIG. 9 illustrates the data structure that is used to compute the set of active categories and select among them. Best-Fit Matcher 900 consists of a set of standard base-level blocks 902, a set of base-level blocks 904 that must be evaluated at run time, a set of base-level blocks 906 that contain only negated conditions, a set of matching objects 908 that determine whether conditions are true or false, statistics 910 about the frequency of words in the domain, and a large number of other temporary variables 912 used in compilation and execution. The distinction among the sets of blocks 902, 904, 906 will be discussed below.

Figure 10:
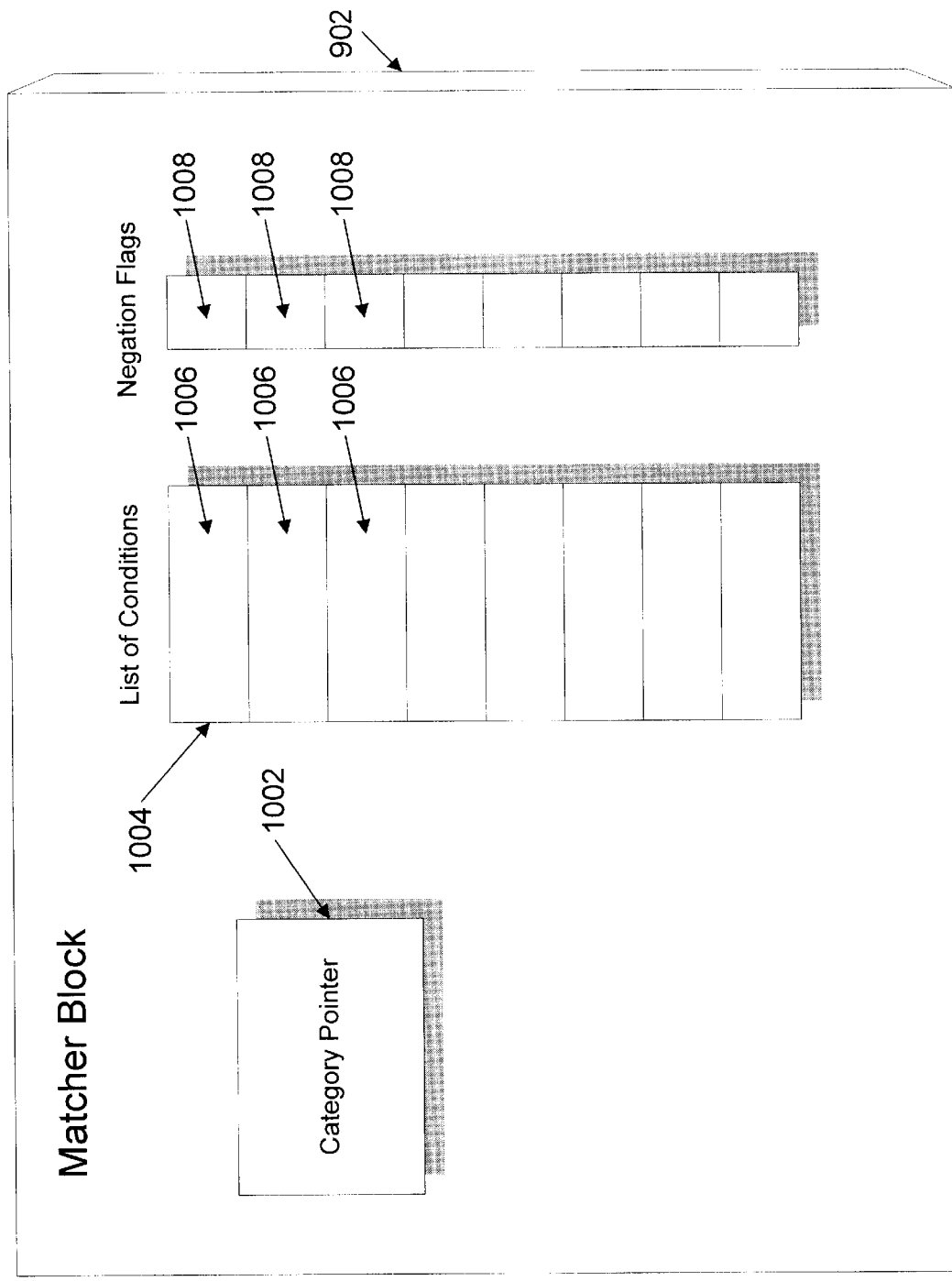
FIG. 10 expands the view of the structure corresponding to a single condition-action block in the BOT script, as used in FIG. 9.

FIG. 10 expands the view of a block 902, 904, 906. Each such block corresponds to a base-level block in the BOT script. Each block consists of a pointer 1002 to the category in which it is found in the script, a list 1004 of conditions 1006 that must be true in order for the block to be active, and a negation flag 1008 for each such condition. In the present implementation of the invention, conditions are always non-negated, and negation of conditions is implemented as a flag in the block containing the conditions rather than in the conditions themselves for efficiency reasons. Other implementations of negation of conditions are obvious to those skilled in the art.

The set of blocks 902, 904, and 906 corresponds to a subset of the base-level blocks in the BOT script. Given that the mechanism ultimately selects categories rather than blocks, it excludes from consideration any blocks that might be active at the time of category selection but may not be active when the category is actually executed. Such blocks can exist because an earlier statement within the category (such as a Remember or Do statement) may change the BOT state, thus causing the block to no longer be active. For instance, in the code fragment shown above, the block beginning IfDontRecall follows a SwitchTo statement, and is thus not considered as a possible activator for the topic "Are you a bot". The topic "Are you X" might not execute a SwitchBack command, or might change the value of the flag ?AnsweredQuestion, thus causing the IfDontRecall condition to have a different value at run-time than at category-selection time. Note that the block will only be executed if the block that contains it (the block beginning If ?What UserSaid Matches) is active, so there is still a base-level condition that will activate the category whenever the Say "I don't know" action would be taken during category execution.

Therefore, any block following a non-IF statement guaranteed to be executed in the same category but before that block is excluded from consideration. The behavior of the mechanism might be improved by testing such statements to determine whether they can in fact affect the conditions in the block. Furthermore, when the set of active blocks is computed at run-time, any block other than the first active block in a particular category is excluded from consideration, as blocks other than the first active block can not be guaranteed to be executed. Therefore, blocks that follow a block consisting only of an Always or IfChance condition can also be excluded from consideration at compile time, as blocks consisting only of Always or IfChance conditions are always active.

Figure 11:
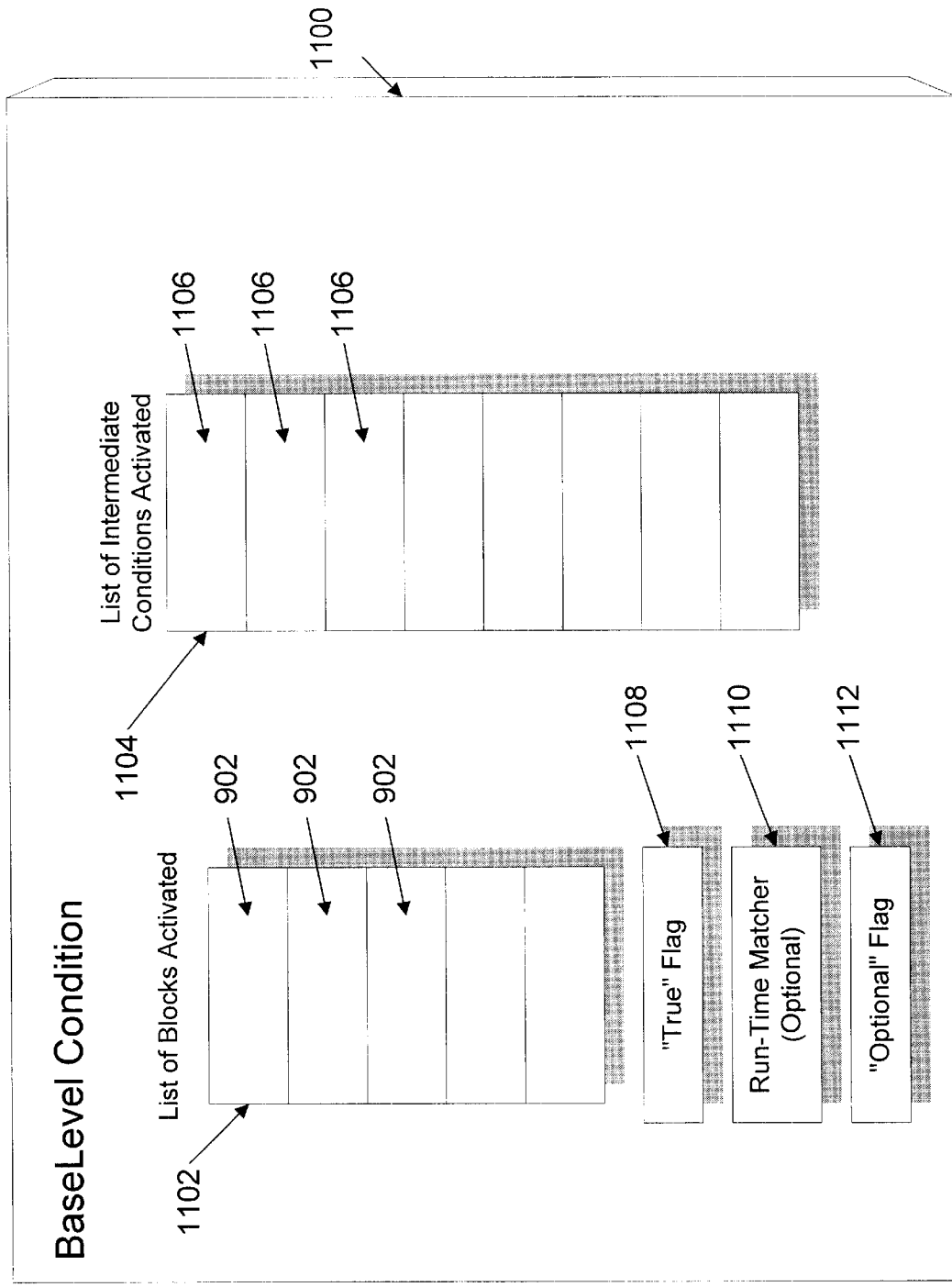
FIG. 11 expands the view of the structure corresponding to a single low-level condition in a BOT script, as used in FIG. 10, suitable for use in a category selection system such as that shown in FIG. 9.

Each condition 1006 corresponds to a condition found in the BOT script. There are two general classes of conditions; BaseLevelConditions and IntermediateLevelConditions. FIG. 11 illustrates a base-level condition. A base-level condition 1100 represents a single condition in the BOT script, either the Recall (or DontRecall) of a single user attribute or the pattern match of a single object to another object. In the present implementation, Chance conditions are considered to be always true for the purpose of category selection, and are therefore not converted into BaseLevelConditions.

In the present implementation of the mechanism, low-level conditions are often used to activate higher-level conditions that depend on them, or to activate blocks themselves. Therefore, each BaseLevelCondition includes pointers 1102 to any Blocks 902 that it activates, and pointers 1104 to any IntermediateLevelConditions 1106 that it activates. The circumstances under which a BaseLevelCondition activates a Block 902 or IntermediateLevelCondition 1106 are disclosed below.

Ordinarily, the value of a condition is set by a matching object described below. This value is assigned by setting a flag 1108. However, in the present implementation of the invention, there are some conditions whose values, due to efficiency reasons, are not set by an external matching object. Such conditions must also include a "run-time matching object" 1110 that can be called when necessary to determine a value for the condition; other conditions merely contain a NULL pointer in place of matching object 1110. The representation and implementation of such run-time objects would be well known to one skilled in the art.

As stated earlier, all of the BaseLevelConditions are non-negated conditions; that is, they are true if an attribute is recalled or a matching operation succeeds. If the actual condition found in the BOT is a negated condition, this information is included in the MatcherBlock or IntermediateLevelCondition that contains the BaseLevelCondition. However, BaseLevelConditions can be "optional" if they represent a condition that is not needed in order for a block to be active, but, if true, should be considered when selecting the block that most specifically matches the input. Such optional conditions are indicated through the use of a flag 1112.

Figure 12:
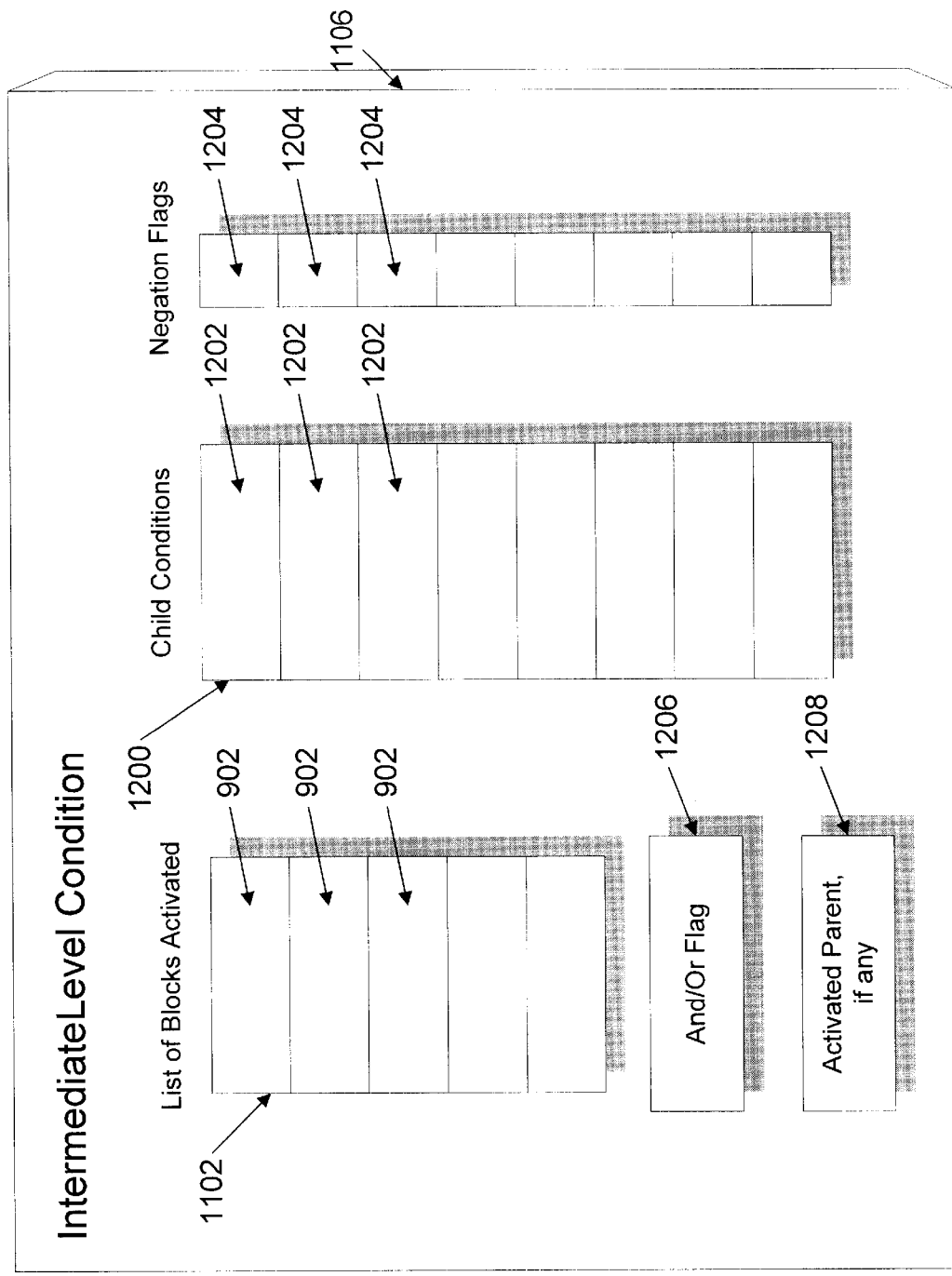
FIG. 12 shows a view of one embodiment of a compound condition, suitable for use in a category selection system such as that shown in FIG. 9.

FIG. 12 illustrates an intermediate-level condition. An intermediate-level condition represents the conjunction or disjunction of one or more conditions, either base-level or intermediate-level, known as "child conditions." (An intermediate-level condition with only a single child condition could clearly be replaced by its child condition.) The intermediate-level condition structure 1106 includes a list 1200 of child conditions 1202. As in Matcher Blocks, the child conditions can be negated; such negated child conditions are indicated by a negation flag 1204. A flag 1206 indicates whether the condition itself is a conjunction or disjunction of the child conditions. Finally, each condition can activate a set 1102 of matcher blocks 902 and a pointer 1208 to at most one other IntermediateLevelCondition 1106. The circumstances under which an IntermediateLevelCondition activates a Block 902 or IntermediateLevelCondition 1106 are disclosed below.

In the present implementation, these conditions correspond closely to the conditions and objects built in the compilation of the BOT script; the matching of a single PatternList is a BaseLevelCondition, while the matching of a list of objects (separated by commas in the BOT script) is represented as an IntermediateLevelCondition disjunction. In the present implementation, IntermediateLevelConditions form a forest of conditions; BaseLevelConditions may be the children of many IntermediateLevelConditions, but IntermediateLevelConditions have only one parent condition of which they are a child. There are many logically equivalent ways in which a BOT script can be represented as IntermediateLevelConditions, and the present invention should not be limited to any particular method for such representation.

Figure 13:
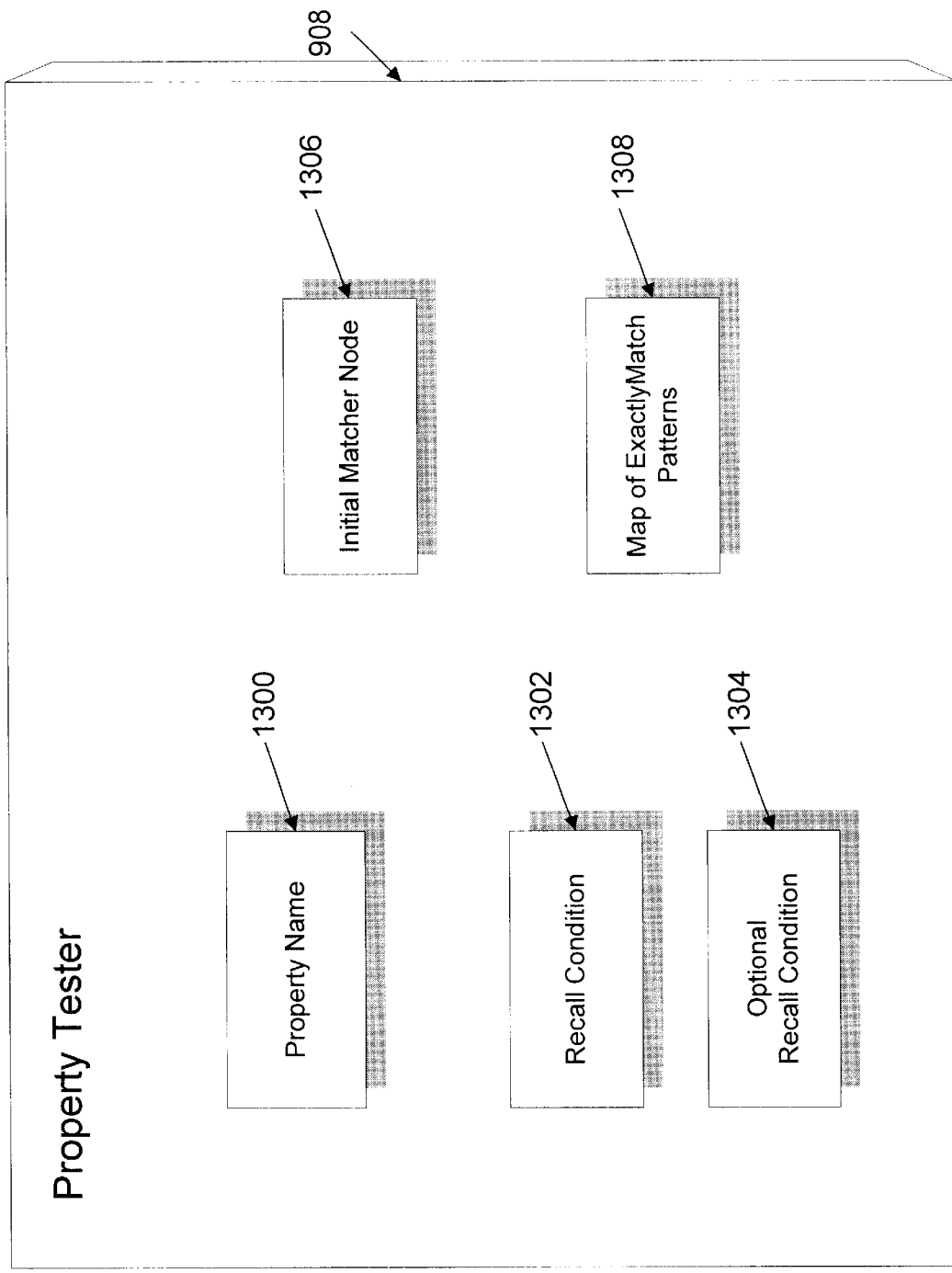
FIG. 13 expands the view of a tester for user properties shown in FIG. 9.

FIG. 13 illustrates the structure of CMatcherPropertyTester objects 908, which serves to set the values of most of the BaseLevelConditions 1100. Nearly all of the conditions found in most BOT scripts in our current scripting language consist of either testing the recall of a memory attribute or matching the value of a memory attribute (such as the system-defined attribute ?WhatUserSaid) against a fixed pattern or PatternList. Therefore, for each memory attribute that is used in a condition in some standard category in the BOT script, the truth value of certain BaseLevelConditions 1100 will need to be set. Each such memory attribute has a PropertyTester 908 specific to that attribute name 1300. Such a property tester includes a pointer 1302 to the BaseLevelCondition 1100, if any, for the recall of that attribute. It also includes a pointer 1304 to the BaseLevelCondition 1100, if any, that corresponds to a condition testing the optional recall of that attribute (such a condition is always true, but may affect the selection of a category as described below.) Finally, the PropertyTester 908 will perform pattern matching for any BaseLevelCondition 1100 that tests that attribute 1300 against a fixed pattern. Matches and Contains tests (and their negations) are handled using a PatternMatching structure, indicated by a pointer 1306 to the first node of a PatternMatcherObject for that attribute (more details on this pattern matching process are disclosed below.) ExactlyMatches tests that compare the attribute to a fixed pattern can be computed efficiently without requiring any pattern-matching, by simply using a map 1308 from fixed pattern strings to BaseLevelConditions 1100.

Any BaseLevelCondition 1100 that is not included in any PropertyTester 908, either because the left-hand side of the match is not an attribute or because the right-hand side is not a fixed pattern, is labeled as a run-time condition and assigned a run-time matching object 1110. Such a condition is individually tested when needed at run-time; clearly it is undesirable from an efficiency standpoint to use too many of these, but any arbitrary condition can be stored as a RunTimeCondition if necessary.

Figure 16:
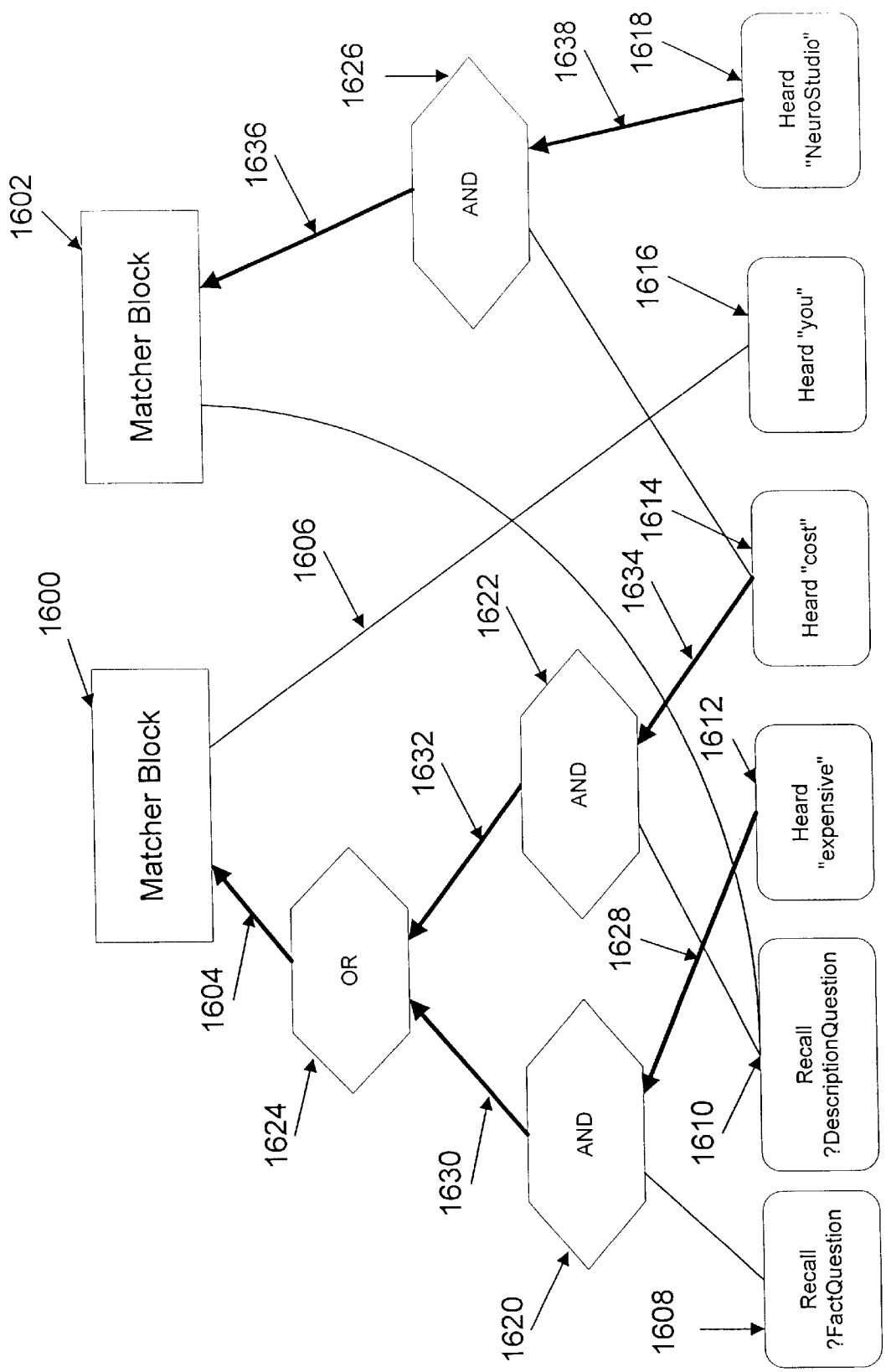
FIG. 16 shows a hierarchy of conditions and low-level blocks created from a particular BOT script for use in condition evaluation in a category selection system.

FIG. 16 illustrates a block/condition structure created from a particular BOT script to be described in the following section. The details of FIG. 16 are discussed in the following section, but the overall structure of the example illustrates the structure of blocks and conditions. The blocks 1600, 1602 are base-level blocks in the BOTscript. Conditions 1608, 1610, 1612, 1614, 1616, 1618 are base-level conditions 1100 whose values are set by PropertyTesters 908 (not shown in FIG. 16). Conditions 1620, 1622, 1624, 1626 are intermediate-level conditions 1106. The heavy arcs 1604, 1636 leading to the blocks 1600, 1602 correspond to block activation pointers 1102 in the conditions. The heavy arcs 1628, 1634, 1638 between base-level conditions and intermediate-level conditions represent condition activation pointers 1104, while the heavy arcs 1630, 1632 between intermediate-level conditions represent parent activation pointers 1208. All arcs directly below an intermediate-level condition represent child pointers 1200.

Once the values of the BaseLevelConditions 1100 are determined (except for the run-time subset of the base-level conditions), the value of any IntermediateLevelCondition 1106 can, when needed, be computed in top-down recursive fashion, using child pointers 1200 and recursive computation techniques well-known to those skilled in the art. In this process, the values of BaseLevelConditions and RunTimeConditions are tested or computed as needed. In the structure displayed in FIG. 16, the activation value of the block 1600 would be determined by computing the value of the intermediate-level condition 1624 and testing the value of the base-level condition 1616; if both were true, the block would be active. The value of intermediate-level condition 1624 would be determined by computing the values of its child intermediate-level conditions 1620 and 1622; if one or both are true, then intermediate-level condition 1624 is true. ("Short-circuiting" evaluation could be used to avoid computing the second condition if the first is true, but cannot be used if the specificity values of the conditions will be needed later.) Similarly, the value of condition 1620 is determined from the values of base-level conditions 1608 and 1612, while the value of condition 1622 is determined from the values of base-level condition 1610 and 1614. (Recall that the values of all base-level conditions were determined earlier.)

However, the fact that under ordinary circumstances only a small subset of the BaseLevelConditions are true can be used to compute the values of the IntermediateLevelConditions much more efficiently than by using the top-down method described above. In the present implementation of the invention, the first step in the selection of a category given an input is to use all of the PropertyTester objects 908 to determine the subset of the ordinary BaseLevelConditions 1100 that are true given the input. Any BaseLevelCondition, other than the RunTimeConditions, that is not labeled as true by this process can be assumed to be false. Since in any particular situation there are generally far more conditions in a BOT script that are false than are true, this process is significantly more efficient than testing each BaseLevelCondition individually. Thus, after the PropertyTesters are executed, there are three sets of BaseLevelConditions: those known to be true, those known to be false, and the RunTimeConditions, for which no value has yet been determined.

The values of the IntermediateLevelConditions are determined in a similar "bottom-up" fashion, in which any condition that is not directly labeled as true is known to be false. For each true BaseLevelCondition 1100, the list 1104 of IntermediateLevelConditions 1106 are marked as activated. If the IntermediateLevelCondition 1106 is a disjunctive condition, it is known to be true once a BaseLevelCondition activates it. If the IntermediateLevelCondition 1106 is a conjunctive condition, the children 1200 (other than the activator BaseLevelCondition, which is already known to be true) must be tested. For any non-run-time BaseLevelConditions among the children, the truth value will already have been computed. For any run-time BaseLevelConditions among the children, the run-time matcher object 1110 is called (or potentially, a cached value may be used instead if the matcher object 1110 has already been evaluated.) For any IntermediateLevelConditions among the children, the top-down evaluation algorithm described above is used. Thus, the truth value for the IntermediateLevelCondition 1106 is computed. If the condition 1106 is true, and its parent activation pointer 1208 is non-null, its parent condition is activated, and the process is repeated.

Meanwhile, for any true BaseLevelCondition 1100 or true IntermediateLevelCondition 1106 that is encountered in this process, the list 1102 of blocks 902 is also activated. Since blocks are conjunctive conditions, if the activated block 902 has more than one child condition 1006, the other children are evaluated using the top-down evaluation procedure described above.

In order to prevent this algorithm from repeatedly visiting conjunctive IntermediateLevelConditions, each conjunctive condition has one of its child conditions selected as "activator"; this child condition is marked so that it activates the parent node. (Recall that IntermediateLevelConditions are the child of only one condition, while BaseLevelConditions may be the child of many conditions. Therefore, if the child is a BaseLevelCondition 1100, a pointer to the parent is placed in the list 1104 of conditions, while if the child is another IntermediateLevelCondition 1106, the pointer to the parent is placed in the parent pointer 1208.) Blocks are handled similarly to conjunctive conditions, although since a condition may be shared among several blocks (if the blocks are within a single higher-level if block within the BOT script), both BaseLevelConditions and IntermediateLevelConditions may activate a list 1102 of blocks 902. Like conjunctive conditions, blocks have only a single activator.

Disjunctive conditions can be activated by any of their children, and thus all children of a disjunctive condition have activator pointers to their parent condition.

To return to the example in FIG. 16, note that some of the arcs (e.g. arc 1628) are shown with heavy lines. These heavy arcs represent activator pointers. Thus, if BaseLevelCondition 1612 is found to be true, it will activate its parent IntermediateLevelCondition 1620. The selection mechanism will then check the other children of condition 1620 (in this case, BaseLevelCondition 1608.) If they are all found to be true, condition 1620 will be true, and will activate IntermediateLevelCondition 1624, which will in turn activate MatcherBlock 1600. The other child of the MatcherBlock, BaseLevelCondition 1616, will now be tested; if it is true the MatcherBlock will be true. Note that the other BaseLevelConditions 1608 and 1616 used in the computation are not activator nodes and thus do not activate any IntermediateLevelCondition. If these two conditions 1608 and 1616 were true but the activator condition 1612 were not, no IntermediateLevelConditions would be activated and no computation would be done for this block.

In order for this activation method to work efficiently, no IntermediateLevelCondition or MatcherBlock should be activated by a condition whose value is false or unknown. Recall that the number of true conditions is generally far smaller than the number of false conditions. If the activator for a condition or block is a negated child, the condition or block will be activated when the child is false, which will occur most of the time. Therefore, negated children are never chosen as activators. If instead the activator is a RunTimeCondition, its value will be unknown at run-time and must be computed every time the selection process is run. Therefore, RunTimeConditions are also never selected as activators. Finally, if a child of a disjunctive IntermediateLevelCondition is inappropriate as an activator, for instance because it is negated or depends on a RunTimeCondition, the disjunctive condition will be inappropriate as an activator and should not be chosen as an activator for other IntermediateLevelConditions or MatcherBlocks. The selection of activators for IntermediateLevelConditions and MatcherBlocks is discussed in greater detail below.

This restriction leaves open the possibility that certain MatcherBlocks will have no suitable child conditions to be chosen as an activator, if all conditions involved in the block depend on RunTimeConditions or negated conditions. Such blocks must be explicitly tested each time category selection is to be done, and are included in the matcher object 900 in the list 904 of non-activated matcher blocks. In addition, RunTimeConditions whose values depend on the testing of other conditions (in the present scripting language, this is exactly the set of conditions that include a reference to the value of a wildcard from an earlier match, such as a *1 or #1 value) are implemented by requiring that the conditions in the entire block be tested at run-time in order to determine the value of the reference. Such blocks are stored in the matcher object 900 in the list 906 of run-time matcher blocks.

The mechanism for category selection will function regardless of the method used for selection of an activator for each MatcherBlock and conjunctive IntermediateLevelCondition. However, the mechanism will function most efficiently if these activators are chosen such that (1) every IntermediateLevelCondition and MatcherBlock is activated as infrequently as possible, and (2) activators that require additional computation beyond that done by the PropertyTesters are not used.

Therefore, activators are chosen according to the frequency with which they are likely to be true. In the present implementation, the frequency estimate of Recall conditions and word matching is the same frequency value used in computing run-time specificity, based on the frequency of words in the BOT script. The frequency estimates for PatternLists, optional elements, and compound conditions are computed somewhat differently than the run-time estimates, however. For purposes of activator selection, the frequency of a condition that tests for a PatternList is equal to the frequency of the most common element of that PatternList; it is also plausible to use other measures, such as the sum of the frequencies of all elements of the PatternList. BaseLevelConditions that are negated, optional, or depend on a RunTime computation are arbitrarily assigned a frequency of 1 in order to prevent them from being chosen as activators.

The frequency estimate for an IntermediateLevelCondition is computed based on the frequencies of its elements. For a disjunctive condition, the frequency of the condition is estimated to be the frequency of the most frequent child. Other formulas, such as the sum of the frequencies of all children, could be used instead.) For a conjunctive condition, the frequency of the condition is estimated to be the product of the frequencies of all children, multiplied by a constant (currently 2) for each child beyond the first, to represent the fact that the conditions that are tested in a conjunctive condition in a BOT script tend to be correlated. It will be appreciated that the mechanism will function efficiently as long as the frequency estimates are approximately correlated with the true frequencies of the conditions; it is not necessary for the frequency estimates to be close to the true frequencies, nor to be computed using the particular formulas described above.

Once the frequency has been estimated for each node, the activators for each node are computed by selecting the child with the lowest frequency value for each MatcherBlock or conjunctive IntermediateLevelCondition. This will result in the conditions and blocks being activated as infrequently as possible, while preventing any negated conditions or RunTimeConditions from being chosen (as those conditions are assigned a frequency of 1.) Any MatcherBlock for which all children have frequency value 1 is not assigned an activator and is stored in the list 904 of non-activated MatcherBlocks.

Figure 15:
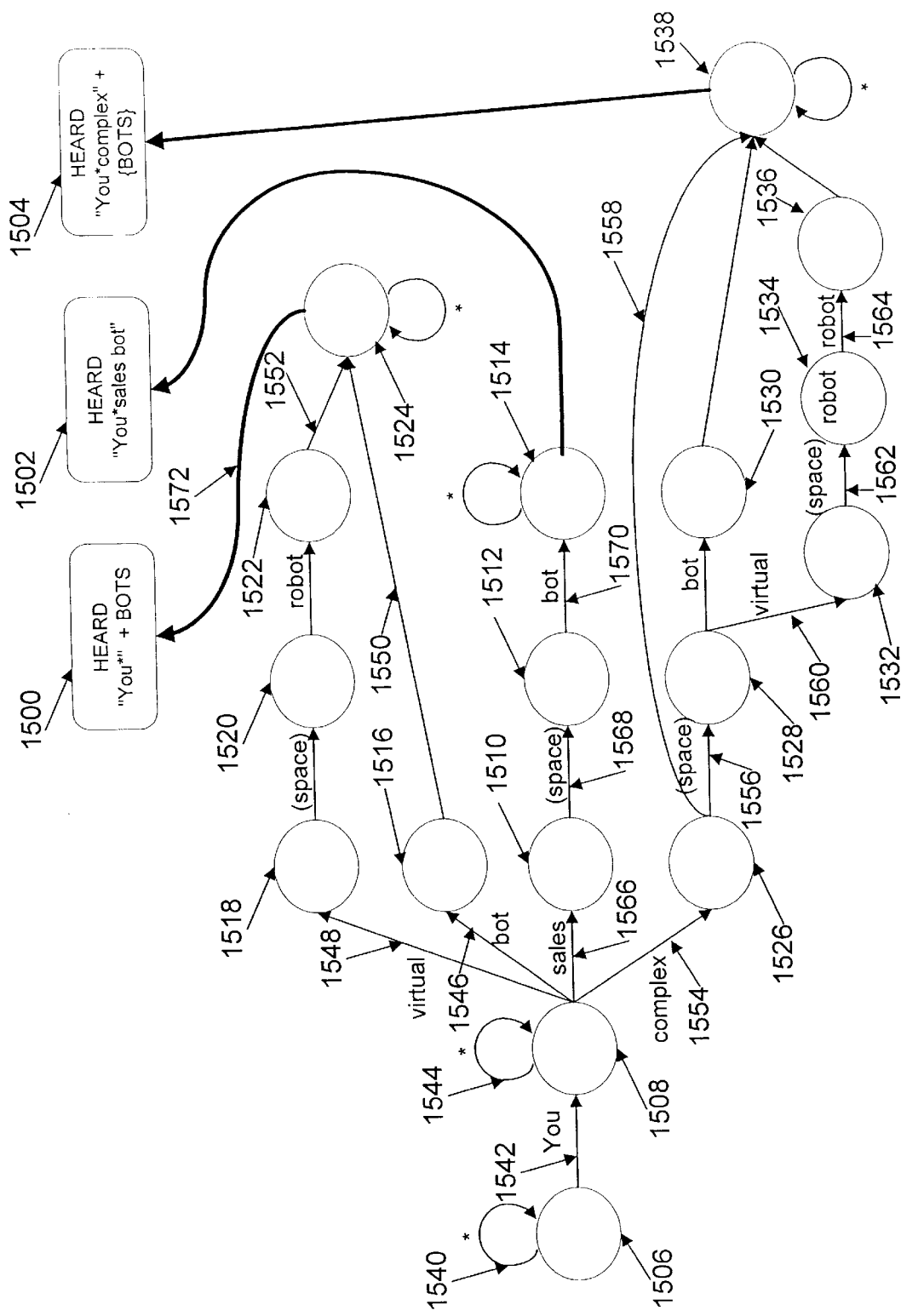
FIG. 15 shows a data structure created from a particular BOT script for pattern-matching in a category selection system.

The pattern-matching system of the PropertyTesters will now be discussed in greater detail. The function of the pattern-matching system is to map attribute values (such as the input value ?WhatUserSaid) into the set of pattern-matching BaseLevelConditions that are true given the value. The implementation of the pattern-matching system can be viewed as non-deterministic finite state automata (NFA)

where each node represents a pattern and each arc represents an element for pattern matching, for instance a word, space, punctuation mark, wildcard character, etc. FIG. 15 illustrates an NFA pattern-matcher created from a particular BOT script, to be discussed later.

Figure 14:
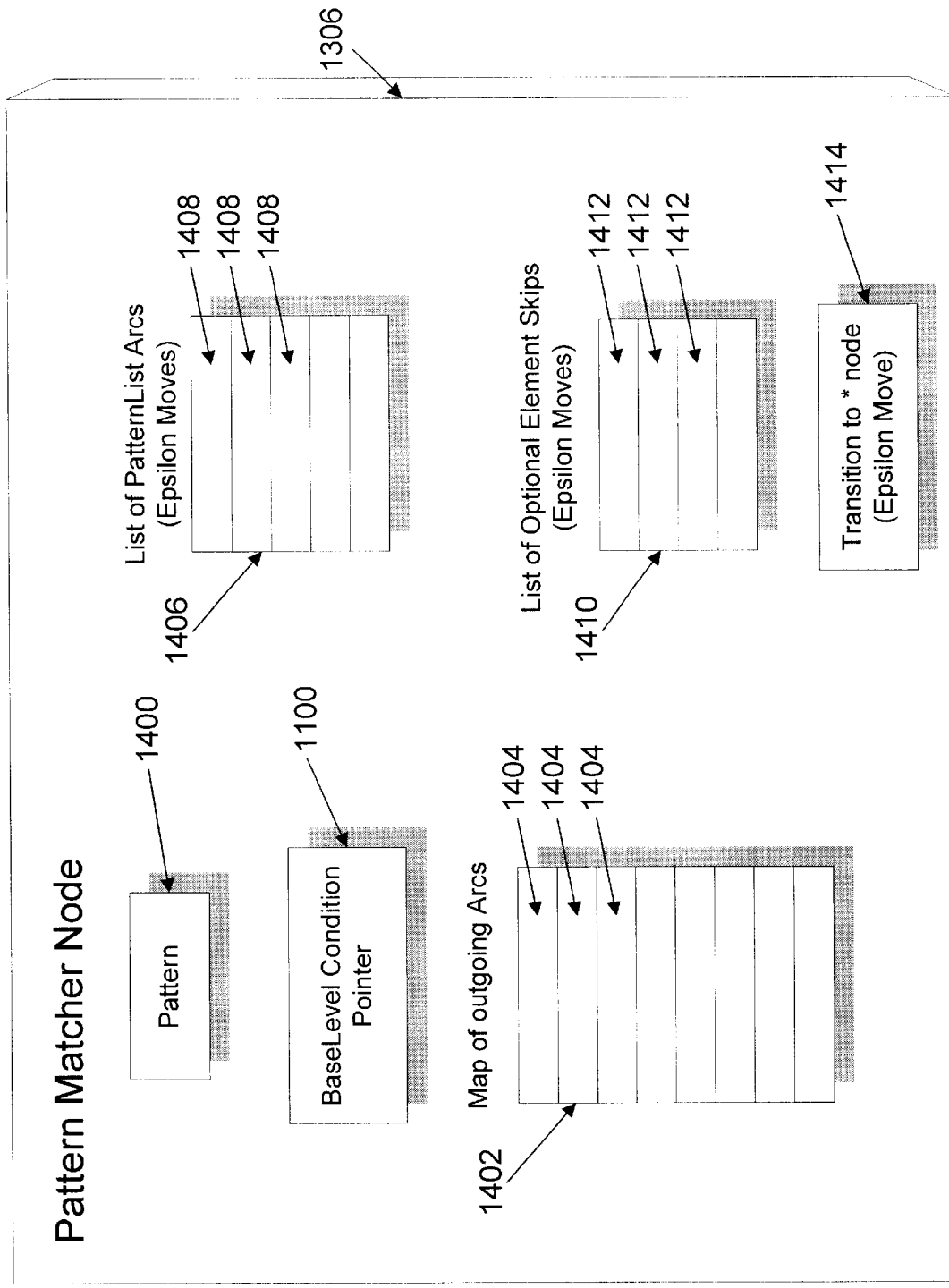
FIG. 14 shows a view of one embodiment of a node in a pattern-matching structure, suitable for efficient parallel pattern-matching in a category selection system such as that shown in FIG. 9.

FIG. 14 displays the structure of a single node in a pattern-matching NFA.

Each node 1306 is associated with a partial pattern 1400 that represents some initial substring (or possibly the entire string) of at least one pattern found in the BOT script. When the node is active, this indicates that the input to the pattern-matching NFA, as processed so far, matches the pattern 1400. This pattern value 1400 is included in the representation only for debugging and explanation purposes; it is not used in the actual execution. If the pattern 1400 corresponds to a pattern matching condition that is found in the BOT script, there is a pointer to the BaseLevelCondition 1100 that corresponds to that pattern matching operation. (Otherwise this pointer is NULL.) If the node is active when the end of the input is reached, the BaseLevelCondition 1100 will be marked as being true.

Words, spaces, punctuation marks, one-word wildcard characters, and similar objects that match a fixed element of the input are represented as arcs in the NFA. These arcs are represented in a pattern-matcher node 1306 as a map 1402 of associations 1404 of such objects with pointers to other nodes. For example, arc 1542 (representing the word "you") and arc 1568 (representing a space) are such arcs.

Optional elements are represented by having the element itself be represented by one or more normal arcs 1404 and adding an epsilon-move (an arc that can be taken without processing any input symbol) between the node immediately preceding the optional element and the one at its end. This set of all optional-element epsilon-move arcs 1412 from a node 1306 is stored as a list 1410 within the node. (Note that the category selection mechanism, as described, allows for optional elements both within the pattern-matching structure and at the level of BaseLevelConditions. Optional elements within the pattern-matching structure are less efficient but are needed in the case of optional elements within concatenations.) For example, unlabeled arc 1558 is such an epsilon-move arc.

PatternLists are represented with a normal arc 1404 for each element of the pattern list, and an epsilon-move arc 1408 between the end node for each element of the pattern list and another node representing that the PatternList itself has been observed. Such epsilon-move arcs 1408 are stored in the appropriate node 1306 in a list 1406. This representation for PatternLists is used in order to avoid the generation of an exponential number of nodes in the case where two or more PatternLists are concatenated. For example, unlabeled arc 1550 is such an epsilon-move arc.

Figure 17:
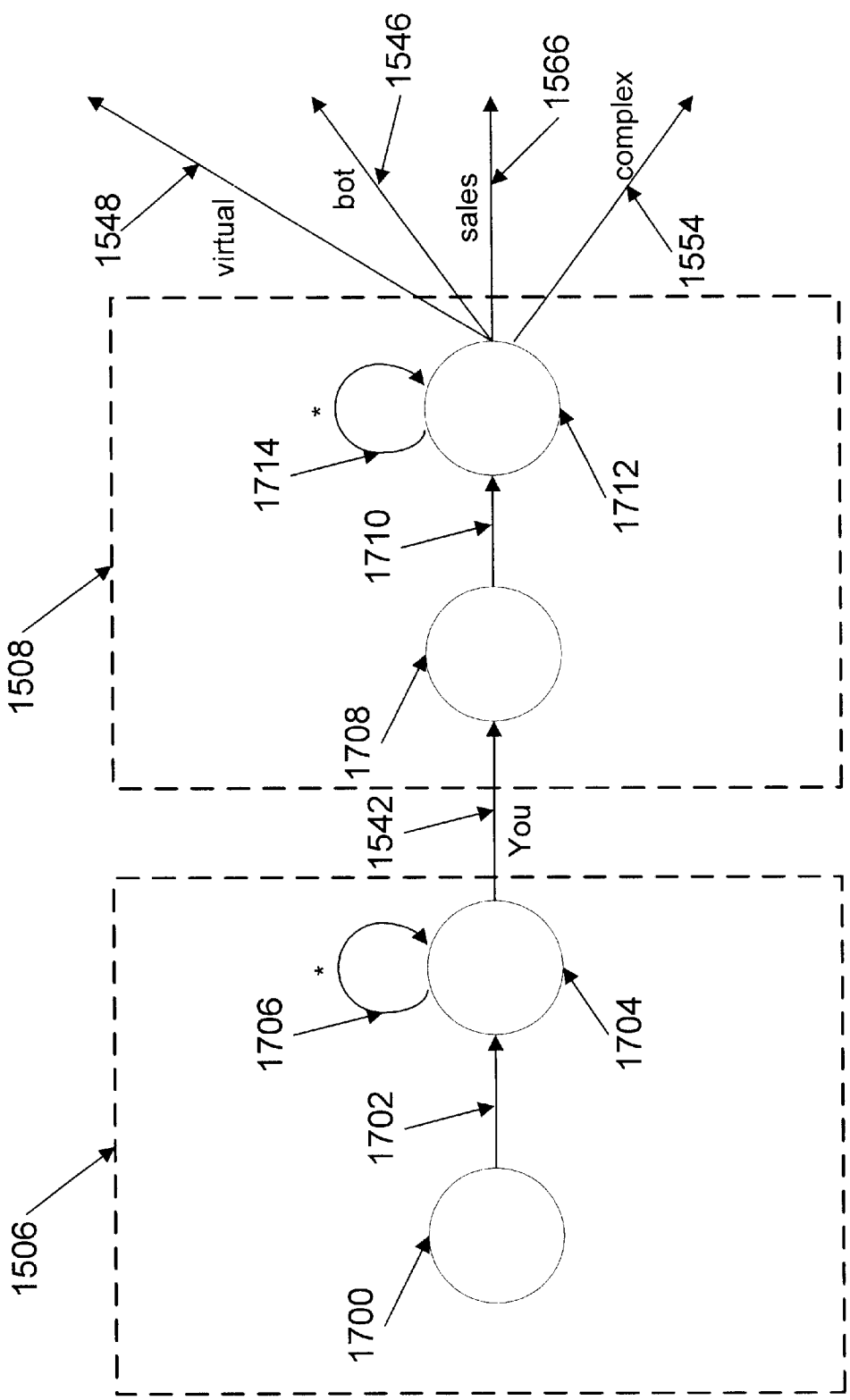
FIG. 17 expands the view of one part of the data structure shown in FIG. 15, showing details that were simplified in FIG. 15.

Finally, true wildcard characters that can match zero words or many words are represented an arc 1414 from the node 1306 (preceding the wildcard) to another node. This wildcard node contains arcs for any patterns that can follow the wildcard, and also contains an arc that loops to itself on any input. This implementation is needed since other arcs 1404 may leave the original node 1306 that do not allow any other input between the pattern 1400 and the label on the outgoing arc 1404. If there are no such arcs 1404, the extra node can be combined with the original node 1306 and the self-looping arc can be included in the node 1306. All of the wildcard arcs in FIG. 15 have been combined in this way. FIG. 17 illustrates the original (non-combined) form of some of the arcs in FIG. 15.

The techniques used to create an NFA from a set of patterns to be matched are well-known to those skilled in the art. For each condition in the BOT script that compares an attribute value to a pattern using "Contains", "Matches", or their negations, a path is added from the start node in the PropertyTester for that attribute to the node corresponding to that pattern, and a link is added from that node to the corresponding BaseLevelCondition 1100. A Matches condition is directly represented as a path in the NFA; a Contains condition is represented by including a * wildcard at the beginning and end of the path.

Conditions that use ExactlyMatches as a test are very efficient to test, so they are tested by including a hash table 1308 in the PropertyTester 908 rather than by using the NFA. As described above, conditions for which the left-hand-side of the comparison is a fixed string or star-buffer value are not computed using BaseLevelConditions at all.

Given the NFA representation of a set of patterns, such as that shown in FIG. 15, determining the patterns that are matched by a particular input can be done by applying the NFA to the input. The techniques for executing a NFA are well known to those skilled in the art. In the present implementation of the invention, the start node of the NFA corresponds to the node matching an empty pattern. There is no single terminal node for the NFA; instead, any node that corresponds to a pattern that is actually used in the BOT script has a pointer to the appropriate BaseLevelCondition. Once the input has been completely processed by the NFA, each node that is active will activate the BaseLevelCondition, if any, that is associated with that node. The execution of the NFA shown in FIG. 15 on several inputs is discussed in the following section.

As discussed above, each BaseLevelCondition 1100 may be an activator for one or more IntermediateLevelConditions 1106. Each true BaseLevelCondition 1100 activates each of the IntermediateLevelConditions 1106 in its list 1104 of conditions. If a disjunctive IntermediateLevelCondition is activated, it is guaranteed to be true; therefore, if it contains an activation pointer 1208 to another IntermediateLevelCondition, that condition is activated (the disjunctive condition is also flagged as being true so that if it is later activated by another child, the activation process does not need to be repeated.) If a conjunctive IntermediateLevelCondition is activated, all the other children of the node are evaluated, and if all are true, the parent condition 1208, if any, is activated. (Recall that only one child of a conjunctive IntermediateLevelCondition is selected as an activator, so this process will not be repeated for other children of the same node.) Finally, both BaseLevelConditions and IntermediateLevelConditions can be activators for MatcherBlocks. For each condition found to be true during the above process, each block 902 in the list 1102 of MatcherBlocks in the condition is activated. As with conjunctive IntermediateLevelConditions, once a MatcherBlock 902 is activated, the other conditions 1006 in the block must be tested using the top-down evaluation process described earlier. If all of the conditions associated with the MatcherBlock 902 are true, the MatcherBlock is selected as an active block. Finally, those MatcherBlocks 904, 906 that do not have an activator condition (as discussed earlier) must be tested explicitly by performing top-down evaluation of the conditions in each block.

For a given input, there will often be more than one active block. Unless the blocks are explicitly given a fixed ordering in the script, the BOT execution mechanism needs an algorithm to select among them. In the present implementation, the block chosen is the one for which the specificity value is highest. Blocks in categories that have already been executed are excluded from the computation.

In the present implementation, if more than one block is active in the same category, only the first of those blocks is eligible for selection, as the actual execution of the category will execute the entire category, and thus is guaranteed to execute the first active block. (Note that it is not guaranteed to execute later blocks in the category even if they are selected as active, as the first block may terminate execution, or may change the state of the BOT.) Clearly the mechanism could instead consider all active blocks within a category as possibilities.

These specificity values could be pre-computed in a manner similar to that used when selecting the activators for IntermediateLevelConditions and MatcherBlocks. However, in cases where a block includes disjunctive conditions, it is possible to make a more accurate run-time estimate of the frequency of the actual input. For instance, a particular block might respond to both the question "Who is Walter?" and the question "Who is he?". The first question is clearly a more specific question than the second, as can be estimated by comparing the frequency of the words "Walter" and "he". Thus, in order to get the best possible performance from the selection mechanism, the specificity estimates for each active block may need to be computed at run time. (Although this computation is described as a separate process in this description, the computation is actually done simultaneously with the selection of the active blocks.)

The run-time estimate of the specificity value for a BaseLevelCondition is based on the set of paths that were taken from the start node of the matcher NFA to the node that corresponds to the BaseLevelCondition. If there is only one such path for the given input, the specificity estimate is simply the sum of the specificity of all the arcs in the path. (In fact, if there is only one possible path between the start node and the condition node, the specificity value can simply be computed at compile time. If there is more than one possible path, the specificity estimate may vary and must be computed at run-time.) If there is more than one path for the given input (either because there is an optional element that was found, or because two or more elements of a PattenList were found), the highest specificity value is chosen. (It will be appreciated that other heuristics may also be used.) In the present implementation, the specificity values for arcs are based on the frequency of words in the Examples found in the BOT script, but other sources of frequency estimates could also be used, including the possibility of keeping a database of word frequency in the questions that are asked to the BOT as it is executing. The following section includes several examples of specificity computations for various inputs based on the NFA in FIG. 15.

Similarly, the specificity values for IntermediateLevelConditions are also computed at run-time based on the BaseLevelConditions that were activated. For each disjunctive IntermediateLevelCondition, the specificity value is simply the highest specificity value from all true children of the condition. For a conjunctive condition, as above, the specificity value is the sum of the specificity values of all children, reduced by a constant value (currently 1000) for each child beyond the first. The specificity value of the MatcherBlocks is estimated in exactly the same way as the specificity value of a conjunctive IntermediateLevelCondition. Negated conditions have a fixed specificity, although they could be assigned a specificity value based on 1 minus the frequency of the unnegated condition. Completely optional conditions have a specificity of 0 if they are not true, and their true specificity value if they are. Conditions that are only computed at run-time can be assigned specificity values based on the frequencies of the words in the input that actually match the condition. (Again, it will be appreciated that a variety of methods could be used to estimate the frequency of a condition at run-time, including the direct use of an estimate generated at compile-time or the assignment of frequency values by the BOT author, and that the scope of the present invention should not be limited to any particular method of estimating condition frequency.) The following section includes several examples of specificity computations for various inputs based on the condition structure in FIG. 16.

Once the specificity value for each active block has been computed, the activation mechanism simply selects the block with the highest specificity value for execution, breaking ties according to the Focus of Attention mechanism as discussed in the above-incorporated parent application The category containing this block is then executed in the usual way. The remaining blocks can also be stored if the user is attempting to debug the BOT script, as the BOT author may need to know all of the blocks that were activated by a particular input. If the category returns a value of Continue or NextTopic, the process can be repeated as long as it finds one or more active blocks that have not already been executed.

C. Examples of Automatic Selection of Response

Our first example demonstrates the compilation of a pattern-matching structure from a set of blocks. We begin with the following topic from a BOT script in our present scripting language:

```
PatternList BOTS is "bot", "virtual robot";
Topic "Are you a bot" is
    // ?FactQuestion is a flag that is set for yes/no questions such as "Are you..."
    If Recall ?FactQuestion and Heard "you*" + BOTS Then
        Example "Are you a bot?";
        Say "Yes, I am a bot";
    Done
EndTopic
Topic "Are you a sales bot" is
    IfRecall ?FactQuestion and Heard "you*sales bot" Then
        Example "Are you a sales bot?";
        Say "No, I am a FAQ bot";
    Done
EndTopic
// Note the { } characters which indicate an optional element.
Topic "Are you a complex bot" is
```

-continued

```
IfRecall ?FactQuestion and Heard "you*complex" + {BOTS} Then
    Example "Are you a complex bot?";
    Say "No, I'm a very simple bot";
Done
EndTopic
```

FIG. 15 shows the pattern-matching structure created from the above script by the BOT script compiler. BaseLevelCondition 1500 corresponds to the pattern matching condition in the topic "Are you a bot", BaseLevelCondition 1502 corresponds to the pattern matching condition in the topic "Are you a sales bot", and BaseLevelCondition 1504 corresponds to the pattern matching condition in the topic "Are you a complex bot". Circular nodes (e.g. start node 1506) correspond to nodes in the pattern matcher object; labeled arcs (e.g. arc 1542) correspond to transitions, unlabeled arcs (e.g. arc 1550) correspond to epsilon-moves, and dark-line arcs (e.g. activation arc 1572) correspond to arcs by which pattern matcher nodes activate BaseLevelConditions. The BaseLevelConditions corresponding to the IfRecall questions in the topics are not shown in FIG. 15, nor are the MatcherBlocks themselves. In addition, the wildcard arcs (e.g. arc 1540) have been simplified by combining the two nodes that would otherwise be generated, as the script above does not result in any nodes which contain both wildcard and non-wildcard follow-ups. This combination of nodes is discussed below in the explanation of FIG. 17.

As a first example, consider the pattern matching condition in the topic "Are you a sales bot", which tests for the pattern "you*sales bot". Since the condition is a "Contains" condition, it is represented in the pattern matcher as the pattern "*you*sales bot*". This condition is compiled into the pattern matcher starting from the start node 1506. The first "*" is the label for the self-looping arc 1540 from start node 1506 to itself; the pattern "you" is the label for arc 1542 from node 1506 to node 1508; the "*" following it is the label for the self-looping arc 1544 from node 1508 for itself; the word "sales" is the label for arc leading from node 1508 to node 1510; the space between "sales" and "bot" is the label for the arc leading to node 1512; the word "bot" is the label for the arc leading to node 1514, and the final "*" is the label for the self-looping arc from node 1514 to itself. Thus, start node 1506 corresponds to a state in which a "*" has been matched (i.e. any input has been seen); node 1508 corresponds to the pattern "*you"; node 1510 corresponds to the pattern "*you*sales", and so on. Node 1514 corresponds to the entire pattern "*you*sales bot*" and thus is connected via an activator link to BaseLevelCondition 1502.

Now examine the compilation of the pattern "you*"+ BOTS from the topic "Are you a bot". Since it is a "Contains" condition, the pattern is converted to "*you*"+ BOTS+"*". The first three elements of the pattern are represented as before, using arcs 1540, 1542, and 1544. At node 1508, additional arcs 1546 and 1548 are labeled with the words "bot" and "virtual", respectively, representing the two elements of the PatternList BOTS that can follow node 1508. Since the word "bot", if found, is a complete element of the PatternList, there is an epsilon-move transition 1550 from node 1516 (corresponding to the pattern "*you*bot") to node 1524 (corresponding to "*you*"+BOTS). In order to match the PatternList BOTS, the word "virtual" must be followed by a space (to node 1520) and the word "robot" (to node 1522); another epsilon-move transition 1552 leads from node 1522 to the "*you*" +BOTS node 1524. Finally, another * wildcard is used as the label for the arc from node 1524 to itself. Node 1524 corresponds to the complete pattern and thus activates BaseLevelCondition 1500 via activator link 1572.

Finally, the compilation of the pattern "you*complex"+ {BOTS} differs from the previous pattern in two ways (other than the obvious inclusion of the pattern "complex" on arc 1554 leading to node 1526.) First, there is a Space label on arc 1556 that leads from node 1526 ("*you*complex") to the node 1528 that represents the beginning of the patterns for PatternList BOTS. Arc 1556 represents the space that must separate the word "complex" from the word "bot" or "virtual" if the pattern is to successfully match; in the present embodiment of the scripting language, the "+" operator produces an implicit space between words if there is no other wildcard (such as a "*") that separates them. (Note that the paths between node 1508 and nodes 1516 and 1518 did not need to include an extra space arc, as the space in the input would be matched by the * on arc 1544; the compiler optimizes the pattern matching structure by not including the extra space.) The PattenList BOTS is represented by nodes 1530, 1532, 1534, 1536, and 1538, corresponding exactly to nodes 1516, 1518, 1520, 1522, and 1524 respectively. Finally, there is an epsilon move transition 1558 from node 1526 to node 1538 representing the fact that the entire PatternList BOTS is an optional element in matching. Another * wildcard labels the arc from node 1538 to itself, and node 1538 contains an activation arc that activates BaseLevelCondition 1504.

Now the execution of the structure shown in FIG. 15 on various inputs will be demonstrated. For purposes of illustration in the following example, assume that the specificity of various words has been computed or assigned as follows:

| Word | Specificity |
|---|---|
| You | 3000 |
| Bot | 4000 |
| Virtual | 8000 |
| Robot | 8000 |
| Sales | 6000 |
| Complex | 8000 |

Suppose the matcher is given the input "Are you a bot". As processing of the input begins, the only active node is the start node 1506. The word "are" matches only the arc 1540 labeled "*", so 1506 remains the only active node. The space between "are" and "you" has the same result. The word "you" matches both arc 1540 labeled "*" and arc 1542 labeled "you", so both node 1506 and node 1508 are active. The next space, the word "a", and the space following "a" all match only the "*" arcs 1540 and 1544, so nodes 1506 and 1508 remain the only active nodes. The word "bot" matches the "*" arcs 1540 and 1542 and the arc 1546 labeled "bot", so nodes 1506, 1508, and 1516 are now active. (None of the other arcs leaving node 1508 represent possible transitions given the word "bot".) The epsilon-move arc 1550 also causes node 1524 to become active without any input processing. The matcher has now reached the end of the input string, and nodes 1506, 1508, 1516, and 1542 are active. The only one of these which activates a BaseLevelCondition is 1542, so BaseLevelCondition 1500 is activated. This activation of BaseLevelCondition 1500 is assigned a specificity of 7000 based on the specificity values of the labels of the arcs 1540, 1542, 1544, 1546, and 1550 followed on the path from the start node to the activating node 1542. (The * labels on arcs 1540 and 1544 do not have any specificity value.) Eventually, this BaseLevelCondition will activate a MatcherBlock corresponding to the condition in the topic "Are you a bot". In the present embodiment of the invention, the specificity value of a BaseLevelCondition is computed as the sum of the specificity values assigned to all arcs on the path to the activating node. However, it would be obvious to one skilled in the art that other methods of combining specificity values would be possible, such as simply taking the maximum specificity value of any arc along the path, and that the scope of the present invention should not be limited to any particular method of such combination.

Now suppose the matcher is given the input "Are you a sales bot?". As before, the first part of the input, "Are you a ", activates nodes 1506 and 1508. The word "sales" matches arc 1566 (labeled "sales") as well as arcs 1540 and 1544 (labeled "*"), so nodes 1506, 1508, and 1510 are now active. The space following the word "sales" matches arc 1568 as well as the "*" arcs, so nodes 1506, 1508, and 1512 are now active. (Node 1510 is no longer active as no arc leading to 1510 was matched by the space.) The word "bot" matches arcs 1546 (from node 1508) and 1570 (from node 1512) as well as the "*" arcs 1540 and 1544, so nodes 1516 and 1514 are now active as well as nodes 1506 and 1508. (Node 1512 is no longer active.) The epsilon-move arc 1550 also activates node 1524. The final "?" is now processed; nodes 1506, 1508, 1514, and 1524 all have "*" arcs leaving them, so all remain active, while node 1516 is no longer active. The matcher has now reached the end of the input string, so node 1514 and node 1524 activate BaseLevelConditions 1502 and 1500, respectively. As before, BaseLevelCondition 1500 is assigned a specificity of 7000 for this activation. BaseLevelCondition 1502 is assigned a specificity of 13000 based on the fact that the words "you", "sales", and "bot" on arcs 1542, 1566, and 1570, respectively, were all matched on the path to the activator node 1514. (The space, like the * wildcards, does not add to the specificity in the present implementation.) Eventually, both the block in the topic "Are you a sales bot" and the block in the topic "Are you a bot" will be active, and the matcher will choose the block in the topic "Are you a sales bot" as it has a higher specificity value.

Finally, suppose the matcher is given the input "Are you a complex virtual robot" As before, the first part of the input, "Are you a ", activates nodes 1506 and 1508. The word "complex" matches arc 1554 (labeled "complex") as well as arcs 1540 and 1544, so nodes 1506, 1508, and 1526 are now active. The epsilon-move arc 1558 activates node 1538 as well. Next, the space following "complex" matches arc 1556, activating node 1528. Meanwhile, the "*" arcs from nodes 1506, 1508, and 1538 also match the space, so nodes 1506, 1508, and 1538 remain true. Next, the word "virtual" matches arc 1548 (from node 1508), activating node 1518, and arc 1560 (from node 1528), activating node 1532. (Nodes 1506, 1508, and 1538 all remain active for the remainder of the matching process.) The space now activates nodes 1520 and 1534, and the word "robot" activates node 1522 and node 1536. Epsilon-transition arcs now activate node 1524 (from node 1522) and repeat the activation of node 1538 (from node 1536). The matcher has now reached the end of the input string, so nodes 1524 and 1538 activate BaseLevelConditions 1500 and 1504, respectively.

BaseLevelCondition 1500 is assigned a specificity of 19000 for this activation, based on the words "you", "virtual", and "robot" (note that it has a much higher specificity than in its previous activation.) Node 1538, the activator for BaseLevelCondition 1304, was activated by two separate paths. The path involving arcs 1542, 1554, and 1558 had a specificity of 11000, while the path involving arcs 1542, 1554, 1556, 1560, 1562, and 1564 has a specificity of 27000, based on the words "you", "complex", "virtual", and "robot". BaseLevelCondition 1504 is assigned the specificity of the most specific path to its activator node 1538, or 27000, and therefore will cause the topic "Are you a complex bot" to be selected ahead of the topic "Are you a bot". (Note that if the optional element {BOTS} had not been included in the pattern in "Are you a complex bot?" the topic "Are you a bot" would have been selected instead.)

FIG. 17 illustrates in more detail the operation of the wildcard arcs in the NFA shown in FIG. 15. As discussed above, a * wildcard arc is actually implemented as an epsilon-move transition to another node, which contains a self-looping arc that matches any input. Thus, start node 1700 has an epsilon-move transition 1702 leading to an intermediate node 1704, which contains an arc 1706 (corresponding to * arc 1540 in FIG. 15) that loops back to itself. The arc 1542 for the word "you" is thus a transition from intermediate node 1704 to node 1708 rather than directly from start node 1506 to node 1508. The entire set of start node 1700, epsilon-move transition 1702, intermediate node 1704, and * arc 1706 are equivalent to start node 1506 and * arc 1540 in FIG. 15.

This implementation of the * wildcard arcs is necessary in order to distinguish between the empty string and the wildcard pattern "*", as well as to distinguish between words separated by spaces and words separated by * wildcard characters. For instance, suppose the BOT script contained a condition:

If ?WhatUserSaid Matches "what".

In order to test for this condition, the arc labeled "what" would need to exit from node 1700 in FIG. 17; if it exited from node 1506 in FIG. 15, or from node 1704 in FIG. 17, an input such as "so what" would be considered to match "what"; the word "so" and the space following it would match the wildcard character and the word "what" would match the arc labeled "what".

Similarly, the node 1508 and its self-looping * arc 1544 in FIG. 15 is represented by a node 1708, an epsilon-move transition 1710, an intermediate node 1712, and a * arc 1714. Thus, if an IfHeard condition in the BOT script contained a pattern such as "you are", the "space" transition would leave from node 1708 rather than from node 1712, thus preventing inputs such as "you sure are" from matching the pattern "you are".

A final example demonstrates the construction of IntermediateLevelConditions and the selection of activator nodes. We begin with the following two conditions, intended to answer questions such as "Are you expensive?", "What do you cost?", and "What does NeuroStudio cost?".

```
// Condition #1
IfHeard "you" Then
    If (Recall ?FactQuestion and Heard "expensive") or
        (Recall ?DescriptionQuestion and Heard "cost") Then
// Condition #2 (this would most likely be more complex in a real script)
IfHeard "cost" and "NeuroStudio" Then
```

It will be appreciated that "?FactQuestion" is a flag set for yes/no questions such as "Are . . . ?" while "?DescriptionQuestion" is a flag set for "What . . . " questions. Both "?FactQuestion" and "?DescriptionQuestion" are flags that are set in a set of standard libraries that are being used for these examples.

FIG. 16 illustrates the structure of BaseLevelConditions, IntermediateLevelConditions, and MatcherBlocks constructed by the compiler to handle the above conditions. (The PropertyTester and PatternMatcher objects responsible for setting the values of the BaseLevelConditions are not shown in FIG. 16.) MatcherBlock 1600 represents condition #1 above, and is the conjunction of IntermediateLevelCondition 1624 and BaseLevelCondition 1616 (the IfHeard "you" condition). IntermediateLevelCondition 1624 represents the disjunction of IntermediateLevelConditions 1620 and 1622, representing the two general question types covered by the condition. IntermediateLevelCondition 1620 is the conjunction of the recall BaseLevelCondition 1608 and the pattern matching BaseLevelCondition 1612, while IntermediateLevelCondition 1622 is the conjunction of the recall BaseLevelCondition 1610 and the pattern matching BaseLevelCondition 1614. MatcherBlock 1602 represents condition #2 above, and is the conjunction of IntermediateLevelCondition 1626 and the recall BaseLevelCondition 1610, while IntermediateLevelCondition 1626 is the conjunction of the pattern matching BaseLevelCondition 1614 and the pattern matching BaseLevelCondition 1618. The activator links for each non-base-level condition are shown as bold arcs, such as arc 1604, while the non-activator links are shown as plain arcs, such as arc 1606.

Now the execution of the structure shown in FIG. 16 on various inputs will be demonstrated. For purposes of illustration in the following example, assume that the specificity of various words has been computed or assigned as follows and that Recall conditions are assigned an arbitrary specificity of 2000:

| | |
|---|---|
| you | 3000 |
| cost | 6000 |
| expensive | 8000 |
| NeuroStudio | 8000 |

First, the selection of activators at compile-time is illustrated. The conjunctive IntermediateLevelCondition 1620 represents the conjunction of the Recall ?FactQuestion condition 1608 and the Heard "expensive" condition 1612. The matching condition 1612 has a specificity of 8000, while the recall condition 1608 has a specificity of only 2000. Therefore, condition 1612 is selected as the activator for IntermediateLevelCondition 1620, and IntermediateLevelCondition 1620 is assigned a specificity of 9000 (8000+2000 minus the "correlation factor" of 1000.) Similarly, the condition 1614 that tests for the word "cost" is selected over the recall condition 1610 as the activator for IntermediateLevelCondition 1622, and condition 1622 is assigned a specificity of 7000. As described above, disjunctive IntermediateLevelCondition 1624 is activated by both of its children, and assigned a compile-time specificity value of 7000, corresponding to the lowest specificity value among its children.

IntermediateLevelCondition 1624 (specificity 7000) is chosen over BaseLevelCondition 1616 (specificity 3000) as the activator for MatcherBlock 1600. BaseLevelCondition 1618 (specificity 8000) is chosen over BaseLevelCondition 1614 (specificity 6000) as the activator for IntermediateLevelCondition 1626, which is assigned a specificity of 13000 (8000+6000−1000). Finally, IntermediateLevelCondition 1626 (specificity 13000) is chosen over BaseLevelCondition 1610 (specificity 2000) as the activator for MatcherBlock 1602.

Now, suppose the matcher is given the input "Can you tell me the cost of NeuroStudio?" This input is classified as a ?DescriptionQuestion by the standard libraries, since it is really asking for information about the cost of NeuroStudio. In FIG. 16, BaseLevelConditions 1610, 1614, and 1618 are active. Condition 1614 activates IntermediateLevelCondition 1622, while Condition 1618 activates IntermediateLevelCondition 1626. The matcher first checks the other children of IntermediateLevelCondition 1622 (in this case, only condition 1610) and finds that all are true, so condition 1622 is active, and has specificity 7000, using the same calculation as before. Similarly, the other children of IntermediateLevelCondition 1626 are checked, and condition 1626 is found to be true and given a specificity value of 13000. Condition 1622 then activates condition 1624, which is now guaranteed to be true since it is a disjunction. Since no other children of 1624 are true, Condition 1624 has a specificity of 7000 (it would have a specificity of 9000 if condition 1620 were true, as the run-time specificity of a disjunction is equal to the highest specificity of any true child.) Condition 1624 now activates MatcherBlock 1600. The matcher now checks the other children of MatcherBlock 1600 and finds them true. The block has a specificity of 9000 (7000+ 3000−1000) and is an active block. Similarly, condition 1626 activates MatcherBlock 1602. The other children of MatcherBlock 1602, in this case condition 1610, are true, so the block 1602 is active, and has a specificity of 14000 (13000+2000−1000). This block has a higher specificity than block 1600, so MatcherBlock 1602 is selected and condition #2 is chosen as the "best match" to the input.

Suppose instead that the matcher is given the input "Do you cost a lot?" According to the standard library of question types used in our examples, this is classified as a ?FactQuestion; therefore BaseLevelConditions 1608, 1614, and 1616 are active. Condition 1614 activates IntermediateLevelCondition 1622. The matcher then checks the other children of condition 1622 and finds that BaseLevelCondition 1610 is not true. Therefore IntermediateLevelCondition 1622 is not true and does not activate any other conditions. No other BaseLevelCondition activates any other condition, so neither matcher block is activated by this input.

V. Mechanism for Pronoun Replacement

In certain cases, a method of direct pronoun replacement can be used to perform pronoun disambiguation more effectively than the automatic attention focus mechanism discussed in the above-incorporated parent application.

Topics in GeRBiL can be assigned subjects using the Subjects keyword. These subjects are used to identify the set of related topics that are brought to the front of the attention focus stack whenever a topic is activated. In the present invention, additional information can be given for some subjects such that when such a subject is the focus of the current conversation, pronouns found in the user input can be replaced with appropriate words.

In the present embodiment, pronoun replacement information is assigned to subjects using the SubjectInfo keyword. SubjectInfo declarations appear at the top level of the GeRBiL script, along with PatternList declarations and other declarations.

Pronoun replacement is implemented by including a CMapStringToString structure m_mssReplacements in the CUserRec structure for each user, which contains the current mapping from pronouns to replacements. Initially, this mapping is empty. When a topic is executed that has a subject for which subject information has been declared as described above, each pronoun-replacement pair in the subject information declaration is added to the pronoun replacement map, replacing existing entries in the map when necessary. If a topic that is executed has more than one subject for which subject information has been declared, the map is updated in the reverse of the order in which the subjects are listed in the topic, insuring that the first subject listed has priority over other subjects listed.

Pronoun replacement is not done automatically, but occurs upon the execution of a Compute command with the function name ReplacePronouns, e.g.:

Remember ?WhatUserMeant is Compute ReplacePronouns of ?WhatUserSaid;

This pronoun replacement is implemented by scanning the argument(s) of ReplacePronouns, and for each word in each argument, seeing if it has an entry in the map structure m__mssReplacements for the current user. If so, the appropriate replacement word is substituted; otherwise the word is left unchanged.

1. Example of Pronoun Replacement

Having described the present embodiment of the invention, the operation of the present invention will now be illustrated by describing the execution of a sample script, listed below.

Transcript of Interaction with BOT Incorporating Script Example

Console says: Who is Walter?
    Robot says: Walter is the president of Neuromedia.
    Console says: Is he married?
    Robot says: Walter is married to Maybellyne.
    Console says: Who is Scott?
    Robot says: Scott is the vice president of technology at Neuromedia.
    Console says: Is he married?
    Robot says: I don't know the answer to what you are asking about Scott.

Execution of the Script Example

When execution of the example begins, the replacement map m__mssReplacements in the user record for the visiting user is empty. When the first input, "Who is Walter?" is given to the BOT, the BOT first executes priority topic "Replace pronouns". Since the pronoun replacement map is empty, this topic has no effect, and the attribute ?WhatUserMeant (used in IfHeard) is set to "Who is Walter?" The BOT now executes the standard topics, and selects the topic "Who

```
================================================================
        TABLE 4 - EXAMPLES OF AUTOMATIC PRONOUN REPLACEMENT

SubjectInfo "Walter" is
        Replace "he" with "Walter";
SubjectInfo "Scott" is
        Replace "he" with "Scott";
Priority Topic "Replace pronouns" is
        Always
                Remember ?WhatUserMeant is
                        Compute ReplacePronouns of ?WhatUserSaid;
                Continue
EndTopic
Topic "Who is Walter?" is
Subjects "Walter";
        IfHeard "who*Walter" Then
                Say "Walter is the president of Neuromedia";
        Done
EndTopic
Topic "Is Walter married?" is
Subjects "Walter";
        IfHeard "Walter" and "married" Then
                Say "Walter is married to Maybellyne.";
        Done
EndTopic
Topic "Other questions about Walter" is
Subjects "Walter";
        IfHeard "Walter" Then
                Say "I don't know the answer to what you are asking about Walter.";
        Done
EndTopic
Topic "Who is Scott?" is
Subjects "Scott";
        IfHeard "who*Scott" Then
                Say "Scott is the vice president of technology at Neuromedia.";
        Done
EndTopic
Topic "Other questions about Scott" is
Subjects "Scott";
        IfHeard "Scott" Then
                Say "I don't know the answer to what you are asking about Scott.";
        Done
EndTopic
================================================================
```

For the purposes of illustration, assume that a site visitor engages in the following discussion with a site that has implemented the above script:

is Walter?" as the best match to the input. (The topic "Other questions about Walter" is also activated, but is not considered as good a fit for the question. The other three topics do not match the input and so are not activated at all.) The output "Walter is the president of Neuromedia." is produced. Since the topic "Who is Walter" has subject "Walter", the subject information for "Walter" is added to the replacement map. In the above script, this causes a mapping from "he" to "Walter" to be added to the map. (In a more complex example, other words such as "his" and "him" might also be added.)

Next, the BOT is given the input "Is he married?". The BOT first executes the priority topic "Replace pronouns." The word "he" is found in the m_mssReplacements map and is thus replaced with "Walter", while the words "is" and "married" are not found in the map and are thus unchanged. Thus, the attribute ?WhatUserMeant is assigned the value "Is Walter married?". The BOT selects the topic "Is Walter married?" as the best match to the input (again, "Other questions about Walter" is active but not selected, while the other three topics do not match the input) and the output "Walter is married to Maybellyne." is produced. Again, this topic has subject "Walter", so a mapping from "he" to "Walter" is added to the m_mssReplacements map. Since this mapping is already present, the replacement map is unchanged.

Next, the BOT is given the input "Who is Scott?" and the BOT executes the priority topic "Replace pronouns" for this input. None of the words are found in the replacement map, so ?WhatUserMeant is simply assigned the value "Who is Scott?". In this case, the topic "Who is Scott" is selected as the best match to the input, so the output "Scott is the vice president of technology at Neuromedia." is produced. The topic "Who is Scott?" has subject value "Scott", so the subject information for "Scott" is added to the replacement map. In this case, the mapping from "he" to "Scott" is added to the map, and overwrites the existing mapping from "he" to "Walter".

Finally, the BOT is given the input "Is he married?". The BOT executes the priority topic "Replace pronouns", and this time replaces the word "he" with "Scott", resulting in the value "Is Scott married?" for ?WhatUserMeant. This question activates only the topic "Other questions about Scott" so the output "I don't know the answer to what you are asking about Scott." is produced.

The above described example illustrates a behavior that would be more difficult to implement using only the best-fit matching and automatic focus of attention mechanisms. If best-fit matching is used and the topic "Is Walter married?" contains the pronoun "he" as well as Walter, the question "Is he married?" will activate the topic "Is Walter married?" even if the subject "Scott" is more focused. Using only the best-fit matching and automatic focus mechanisms, the only ways to write a script to respond to the above questions would be to either create a single topic each for Walter and Scott or include an "is Scott married" topic. Neither solution is easy to generalize for complicated BOT scripts.

What is claimed is:

1. In an automated interface program designed to interact and communicate with users, said program executing actions when a category among a set of predefined categories is activated, a method for selecting categories and executing actions associated with said categories, the steps of said method comprising:
  (a) defining a list of categories activatable by said program in response to user input;
  (b) for an input received from a user,
    (i) identifying a set of categories activated by said input, wherein each category in said set matches the received user input;
    (ii) assigning an appropriateness value to each category in said set of activated categories, wherein the appropriateness value is influenced by the likelihood that the category matches a user input;
    (iii) selecting a category from said set of activated categories, wherein the appropriateness value is a first criteria for selecting said category; and
    (iv) executing actions associated with said selected category.

2. The method for selecting categories and executing actions associated with said categories as recited in claim 1, wherein the step of defining a list of categories further comprises:
  defining a set of priority categories such that said priority categories are executed before all other categories.

3. The method for selecting categories and executing actions associated with said categories as recited in claim 1, wherein the step of defining a list of categories further comprises:
  defining a set of default categories such that said default categories are executed after all other categories.

4. The method for selecting categories and executing actions associated with said categories as recited in claim 1, wherein the step of defining a list of categories further comprises:
  defining a set of default categories such that said default categories are executed if no other categories produce output to the user.

5. The method for selecting categories and executing actions associated with said categories as recited in claim 1, wherein the step of defining a list of categories further comprises:
  defining a set of sequence categories such that said sequence categories are executed only when called by other categories.

6. The method for selecting categories and executing actions associated with said categories as recited in claim 1, wherein the step of defining a list of categories further comprises:
  defining a set of sequence categories such that said sequence categories produce a series of sequential interactions with the user.

7. The method for selecting categories and executing actions associated with said categories as recited in claim 1, wherein the step of identifying a first set of categories activated by said input further comprises:
  identifying a first set comprising priority, standard, sequence, and default categories activated by said input.

8. The method for selecting categories and executing actions associated with said categories as recited in claim 7, wherein the step of identifying a first set of categories activated by said input further comprises:
  testing conditions in categories such that said category is activated if said condition is satisfied by said input.

9. The methods of selecting categories and executing actions associated with said categories as recited in claim 8, wherein the step of testing conditions further comprises:
  (i) constructing a graph comprising a plurality of nodes and edges between the nodes, in which the nodes represent predetermined states of user input and the edges represent user input transitions between said nodes; and
  (ii) associating a set of final nodes with conditions within categories, wherein one of said conditions is satisfied if transitions upon a given user input place the state of user input at the associated final node.

10. The method for selecting categories and executing actions associated with said categories as recited in claim 9, wherein in the step of selecting a category from said set of activated categories, wherein the appropriateness value is a first criteria for selecting said category, the determination of the appropriateness value is based on the length of a path in the graph traversed to a final node of a condition.

11. The method for selecting categories and executing actions associated with said categories as recited in claim 10, wherein in the step of selecting a category from said set of activated categories, wherein the appropriateness value is a first criteria for selecting said category, and a second criteria for selecting said category comprises:

selecting a category among said set of categories for which a path length is maximized.

12. The method for selecting categories and executing actions associated with said categories as recited in claim 7, wherein the step of identifying a first set of categories activated by said input further comprises:

(i) testing conditions in said priority categories such that a priority category is activated if said condition is satisfied by said input;

(ii) identifying previously activated sequence categories that have yet to complete their actions according to a previous input;

(iii) testing conditions in said standard categories such that a standard category is activated if said condition is satisfied by said input; and (iv) testing conditions in said default categories such that a default category is activated if said condition is satisfied by said input.

13. In an automated interface program designed to interact and communicate with users, said program executing actions when a category among a set of predefined categories is activated, a mechanism for selecting categories and executing actions associated with said categories, said mechanism comprising:

means for defining a list of categories activatable by said program in response to user input;

means for identifying a set of categories activated by said input, wherein each category in said set matches the received user input;

means for assigning an appropriateness value to each category in said set of activated categories, wherein the appropriateness value is influenced by the likelihood that the category matches a user input;

means for selecting a category from said set of activated categories, wherein the appropriateness value is a criteria for selecting said category; and means for executing actions associated with said selected category.

14. In an automated interface program designed to interact and communicate with users, said program executing actions when a category among a set of predefined categories is activated, a method for selecting categories and executing actions associated with said categories, the steps of said method comprising:

(a) defining a list of categories activatable by said program in response to user input;

(b) for an input received from a user, (i) selecting a set of activated categories based upon an appropriateness metric, said appropriateness metric computed based on the conditions located within each said activated category and influenced by the likelihood that the category matches a user input; and (ii) executing actions associated with said set of categories.

15. The method for selecting categories and executing actions associated with said categories as recited in claim 14, wherein the step of selecting a set of activated categories based upon an appropriateness metric further comprises:

said appropriateness metric computed based on conditions in categories such that said category is activated if said condition is satisfied by said input.

16. The methods of selecting categories and executing actions associated with said categories as recited in claim 15, wherein the step of selecting a set of activated categories based upon an appropriateness metric further comprises:

(i) constructing a graph in which the nodes represent predetermined states of user input and the edges represent user input transitions between said nodes; and (ii) associating a set of final nodes with said conditions within categories, wherein one of said conditions is satisfied if transitions upon a given user input place the state of user input at the associated final node.

17. The method for selecting categories and executing actions associated with said categories as recited in claim 16, wherein the step of selecting a set of activated categories based upon an appropriateness metric further comprises:

said appropriateness metric based on the length of a path in the graph traversed to a final node of a condition.

18. The method for selecting categories and executing actions associated with said categories as recited in claim 17, wherein the step of selecting a set of activated categories based upon an appropriateness metric further comprises:

selecting categories among said first set of categories for which a path length is maximized.

19. The method for selecting categories and executing actions associated with said categories as recited in claim 14, wherein the step of selecting a set of categories based upon an appropriateness metric further comprises:

said appropriateness metric based on a frequency with which said conditions are expected to be true.

20. The method for selecting categories and executing actions associated with said categories as recited in claim 19, wherein said appropriateness metric further comprises:

(i) defining conditions to be patterns of user input; and (ii) estimating the frequency of conditions occurring in user input.

21. The method for selecting categories and executing actions associated with said categories as recited in claim 20, wherein the step of estimating the frequency of conditions occurring in user input further comprises:

estimating the frequency of conditions occurring in example user inputs included in category scripts.

22. The method for selecting categories and executing actions associated with said categories as recited in claim 19, wherein the step of selecting a set of activated categories based upon an appropriateness metric further comprises:

selecting categories for which the conditions associated with the categories are least likely to be true.

23. The method for selecting categories and executing actions associated with said categories as recited in claim 14, wherein the step of selecting a set of activated categories based upon an appropriateness metric further comprises:

(i) associating a specificity value with the at least one category; and (ii) selecting said categories that have specificity values associated with a higher degree of specificity, among the categories that match the input received from the user.

24. The method for selecting categories and executing actions associated with said categories as recited in claim 14, wherein the step of selecting a set of activated categories based upon an appropriateness metric further comprises:

said metric being a numeric value computed for each activated category, the value being based upon the frequency of matched words, partial words, and symbols found in the current input with words, partial words, and symbols found in the conditional clauses located within the category.

25. The method for selecting categories and executing actions associated with said categories as recited in claim 14, wherein the step of selecting a set of activated categories based upon an appropriateness metric further comprises:

selecting said category having more matched words, partial words, and symbols in the conditional clause located within the category.

26. The method for selecting categories and executing actions associated with said categories as recited in claim 14, wherein the step of selecting a set of activated categories based upon an appropriateness metric further comprises:

said appropriateness metric being based on the testing of a Boolean variable, said Boolean variable associated with a memory attribute.

27. The method for selecting categories and executing actions associated with said categories as recited in claim 14, wherein the step of selecting a set of activated categories based upon an appropriateness metric further comprises:

selecting a category from among said set of activated categories wherein two or more categories have the same computed appropriateness metric.

28. The method for selecting categories and executing actions associated with said categories as recited in claim 27, wherein the step of selecting a category from among a set of activated categories wherein two or more categories have the same computed appropriateness metric further comprises:

selecting the category having the highest position on a focus of attention stack.

\* \* \* \* \*